United States Patent
Arakawa et al.

(10) Patent No.: US 6,703,100 B2
(45) Date of Patent: Mar. 9, 2004

(54) DISK-LIKE RECORDING MEDIUM AND METHOD FOR PRODUCING THE SAME

(75) Inventors: Nobuyuki Arakawa, Kanagawa (JP); Ken Minemura, Saitama (JP); Yuji Akiyama, Tokyo (JP); Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 09/926,303

(22) PCT Filed: Feb. 9, 2001

(86) PCT No.: PCT/JP01/00954
§ 371 (c)(1), (2), (4) Date: Nov. 30, 2001

(87) PCT Pub. No.: WO01/59781
PCT Pub. Date: Aug. 16, 2001

(65) Prior Publication Data
US 2002/0155247 A1 Oct. 24, 2002

(30) Foreign Application Priority Data
Feb. 10, 2000 (JP) .......................................... 2000-038241

(51) Int. Cl.[7] .................................................. G11B 5/66
(52) U.S. Cl. ...................... 428/64.2; 428/66.6; 369/282; 360/82; 264/1.31; 264/1.33; 264/1.7; 264/2.1; 264/2.2; 264/106; 264/107
(58) Field of Search ......................... 369/282; 428/64.2, 428/66.6; 360/82; 264/1.31, 1.33, 106, 107, 2.1, 1.7, 2.2

(56) References Cited

U.S. PATENT DOCUMENTS

| | | | | |
|---|---|---|---|---|
| 6,142,761 A | * | 11/2000 | Arakawa et al. | 425/192 R |
| 6,201,783 B1 | * | 3/2001 | Arakawa et al. | |
| 6,210,609 B1 | * | 4/2001 | Takeda et al. | 264/1.33 |
| 6,302,674 B1 | * | 10/2001 | Arakawa et al. | 425/192 R |

FOREIGN PATENT DOCUMENTS

| | | | |
|---|---|---|---|
| EP | 965985 | * | 12/1999 |
| EP | 0 965 985 | | 12/1999 |
| JP | 63-136373 | | 6/1988 |
| JP | 1-211342 | | 8/1989 |
| JP | 4-85773 | * | 3/1992 |
| JP | 6-215517 | * | 8/1994 |
| JP | 2000-11449 | | 1/2000 |
| WO | WO 98/59338 | | 12/1998 |
| WO | 98/59338 | * | 12/1998 |

* cited by examiner

Primary Examiner—Leszek Kiliman
(74) Attorney, Agent, or Firm—Oblon, Spivak, McClelland, Maier & Neustadt, P.C.

(57) ABSTRACT

A recording medium for information signals including a substrate, a signal recording layer provided on one major surface of the substrate and a clamp member having a positioning unit at its center portion and formed of a material that can be magnetically attracted by a magnet. The clamp member is unified to the center portion of the substrate so that the surface of the clamp member will be flush with the substrate surface.

24 Claims, 13 Drawing Sheets

DISK-LIKE RECORDING MEDIUM AND METHOD FOR PRODUCING THE SAME

TECHNICAL FIELD

This invention relates to a disc-shaped recording medium used for recording a variety of information signals, such as speech or video signals, and a method for producing the same.

BACKGROUND ART

Up to now, a disc-shaped recording medium having a signal recording layer formed on a substrate molded from synthetic resin has been in use. As this type of the disc-shaped recording mediums, there are presently known a magnetic disc for magnetically recording and/or reproducing information signals, a magneto-optical disc for recording and/or reproducing information signals by exploiting changes in the direction of magnetization caused by illuminated light, and an optical disc for recording and/or reproducing the information mainly by optical means.

Such a disc-shaped recording medium, that can be mounted exchangeably on a recording and/or reproducing apparatus, is being used. The exchangeable type disc-shaped recording medium is detachably loaded on a turntable of a disc rotating driving mechanism provided in the recording and/or reproducing apparatus. This disc-shaped recording medium is loaded so as to be unified to the turntable to permit synchronous rotation of the disc-shaped recording medium in unison with the turntable.

There are several systems for uniting the exchange type disc-shaped recording medium on a turntable.

One of such systems is the so-called mechanical securing system in which the disc-shaped recording medium is chucked between the turntable and a chuck member to permit the disc-shaped recording medium to be rotated in unison with the turntable. In this mechanical securing system, a center hole provided in the disc-shaped recording medium is engaged by a centering pin formed on a disc setting surface of the turntable to align the center of rotation of the disc-shaped recording medium with that of the turntable. By coincidence of the center of rotation positions, the disc-shaped recording medium is able to be rotated without producing eccentricities with respect to the turntable. Among the disc-shaped recording mediums loaded on the turntable by the mechanical securing system, there are a compact disc (CD), an optical video disc and a DVD (digital versatile disc).

In the mechanical securing system, in which the turntable and the chuck member need to be arranged on both sides of the disc-shaped recording medium, the recording and/or reproducing apparatus is bulky in size. Moreover, there is required a mechanism for causing the chuck member to be moved into contact with and away from the disc-shaped recording medium on the turntable, thus complicating the mechanism for clamping the disc-shaped recording medium.

Another system is a magnetic clamping system which clamps the disc-shaped recording medium for rotation of the disc-shaped recording medium in unison with the turntable by exploiting the magnetic suction. The disc-shaped recording medium used in this system includes a center opening in which to mount a magnetically attracted metallic clamp member. The metallic clamp member has a center positioning hole in which is engaged the distal end of a spindle shaft carrying the turntable. This disc-shaped recording medium is clamped to the turntable by having the clamp member attracted by a magnetic provided on the turn table and by having the distal end of a spindle shaft engaged in a positioning hole provide in the clamp member. At this time, the center of rotation of the disc-shaped recording medium is caused to coincide with that of the turntable by the distal end of the spindle shaft engaged in the positioning hole provided in the clamp member. Typical of the disc-shaped recording mediums loaded on the disc table by magnetic clamp system is a MO (magneto-optical disc).

In the magnetic clamp system, the clamp member provided on the disc-shaped recording medium is attracted by a magnet provided on the turntable to clamp the disc-shaped recording medium and the turntable so that these will be rotated in unison. Since there is no necessity of providing a chuck member for pressure-supporting the disc-shaped recording medium on the turntable, it is possible to realize a simplified clamp mechanism and a thin type recording and/or reproducing apparatus.

Meanwhile, the disc-shaped recording medium, used in the magnetic clamp system, is clamped by the spindle shaft engaging in a positioning hole formed in the clamp member, with the center of rotation of the disc-shaped recording medium then coinciding with that of the turntable. That is, for correctly recording and/or reproducing information signals, the recording tracks of the disc-shaped recording medium need to be scanned correctly by e.g., an optical head. So, the clamp member needs to be loaded correctly in position at the center of the disc-shaped recording medium. For mounting the clamp member, there is such a method in which the clamp member is secured to the disc-shaped recording medium after the center of the recording track formed in the disc-shaped recording medium is brought on e.g., an X-Y table into coincidence with the center opening formed in the clamp member.

In the case of a disc-shaped recording medium used in the magnetic clamp system in which a clamp member is used both for clamping and for positioning the disc-shaped recording medium on the turntable, it is necessary not only to work the clamp member to high accuracy but also to load the clamp member highly accurately at the center of the disc-shaped recording medium thereby rendering the manufacture extremely difficult. In order to eliminate this deficiency, there is also used a magnet clamp system in which the clamp member is afforded with a function of clamping the disc-shaped recording medium to the turntable and with a function of positioning the disc-shaped recording medium with respect to the turntable. In this magnetic clamp system, a centering member provided centrally for the disc table is engaged in a center opening provided centrally on the disc-shaped recording medium to realize coincidence of the center of rotation of the disc-shaped recording medium and that of the turntable, whilst a metallic clamp member mounted on one surface of the disc-shaped recording medium for closing the center opening is magnetically attracted by a magnet provided on the turntable to clamp the disc-shaped recording medium for rotation in unison with the turntable. Typical of the disc-shaped recording medium loaded on the turntable in accordance with this system is a magneto-optical disc with a diameter of 64 mm.

By designing the disc-shaped recording medium in this manner to realize coincidence of the center of rotation with that of the turntable, it becomes possible to facilitate the working of the clamp member and the mounting thereof on the disc-shaped recording medium. By the centering member on the turntable engaging in the center hole formed in the disc-shaped recording medium, the center of rotation formed in the disc-shaped recording medium can be brought more accurately into coincidence with that of the turntable. That is, since the center opening is formed so that its center is coincident with the center of recording tracks formed on the disc-shaped recording medium, the center of the recording tracks can be directly brought into coincidence with the center of the turntable by the centering member engaging in the center opening.

Meanwhile, in recording and/or reproducing an image file or a computer memory with a larger data volume on or from a disc-shaped recording medium, the data transfer speed needs to be increased, so that the rpm of the disc-shaped recording medium needs to be increased, in contradistinction from the case of recording and/or reproducing the speech or still image as conventionally. For high-speed data processing, the rpm of the disc-shaped recording medium of approximately 4000 to 4500 rpm is required.

If a disc-shaped recording-medium is to be rotated at a constant linear velocity (CLV) to record and/or reproduce information signals, it is rotationally controlled so that the linear velocity of the recording track will be constant at the inner and outer rims of the disc-shaped recording medium. If high-speed seek is performed as the disc-shaped recording medium is rotationally driven at the CLV, the rpm of the spindle motor needs to be changed significantly within a short time depending on the read-out positions of the information signals, that is on the inner or outer track positions of the disc-shaped recording medium.

If the rpm of the disc-shaped recording medium is high or if the rpm of the spindle motor is to be changed significantly within a short time interval, the inertia (inertial force) due to rotation of the disc-shaped recording medium is increased. If the inertia is increased, the disc-shaped recording medium tends to be slipped on e.g. the turntable. That is, since the turntable is generally formed of metal, the substrate of the disc-shaped recording medium is formed of synthetic resin and the turntable has a planar supporting surface for the disc-shaped recording medium, the frictional coefficient between the disc-shaped recording medium and the turntable is reduced, so that slip is liable to be produced.

If the disc-shaped recording medium, run in rotation of the turntable, on which it is loaded, undergoes significant eccentricities, not only is the rotary shaft of the spindle motor loaded excessively, but the disc-shaped recording medium is liable to be slipped to increase errors in the information signals recorded and/or reproduced. If the disc-shaped recording medium undergoes slipping, it ceases to be rotated correctly in synchronism with turntable rotation, with the result that the signal recorded or read out in recording or reproduction undergoes jitter, which increases errors in the information signals recorded and/or reproduced.

If the inertial mass is I and the angular velocity of the rotating disc-shaped recording medium is $\omega$, the moment of inertia Fi of a disc-shaped recording medium run in rotation on a turntable on which it is loaded is represented by the following equation (1):

$$Fi = I(d\omega/dt) \quad (1).$$

If the frictional coefficient between the disc-shaped recording medium and the turntable is $\mu$ and the force of clamp applied to the disc-shaped recording medium from the perpendicular direction is N, the disc-shaped recording medium begins to slip when the equation (2):

$$Fi > \mu N \quad (2)$$

is met.

If the substrate of the disc-shaped recording medium is formed of a polycarbonate resin, the inertia produced by the disc-shaped recording medium is as shown in the following Table 1:

TABLE 1

|  | disc 1.2 mm thick | AS · MO | taper-disc |
|---|---|---|---|
| inertia (kgf · s² · m) | $2.9847 \times 10^{-6}$ | $1.4985 \times 10^{-6}$ | $1.8300 \times 10^{-6}$ |
| weight (g) | 15.98 | 9.73 | 11.20 |

Meanwhile, the disc-shaped recording medium, having the substrate thickness of 1.2 m, as shown in the Table, has a uniform thickness of 1.2 mm. A magneto-optical disc, termed an AS·MO (advantage storage MO), has an outer diameter, that is a diameter, of 122 mm, a substrate thickness in a signal recording portion of 0.6 mm and a thickness of the clamp area of 1.2 mm. The taper disc has a thickness of the clamp area of 1.2 mm and a thickness of the outermost rim of 0.6 mm, and presents a tapered area beginning from the clamp area to the outer rim.

The substrate of the disc-shaped recording medium, shown in Table 1, is formed in its entirety of the polycarbonate resin, manufactured by TEIJIN KASEI KK. under the trade name of AD-5503. It is seen from the results of Table 1 that the lighter the disc-shaped recording medium in weight, the smaller becomes the inertia. In particular, it is seen that the AS·MO has an inertia of 61.5% of that of the disc-shaped recording medium having a substrate thickness of 1.2 mm. Stated differently, the larger the weight of the disc-shaped recording medium, the larger becomes the eccentricity of the disc-shaped recording medium in rotation, with the result that the slip tends to be produced between it and the turntable.

For preventing the disc-shaped recording medium from slipping when it is loaded on the turntable in position and run in rotation, it is sufficient if the clamp force N to the turntable or the frictional force $\mu$ with respect to the turntable is increased, as may be seen from the above equation (2).

If the clamp force N of the disc-shaped recording medium to the turntable is increased, the force necessary for detaching the disc-shaped recording medium from the turntable is increased. So, the mechanical strength of the mechanism for loading the disc-shaped recording medium on the recording and/or reproducing apparatus needs to be increased, thus increasing the size of the recording and/or reproducing apparatus. For withstanding the large clamp force, the mounting strength of the clamp member on the disc-shaped recording medium needs to be increased. For increasing the mounting strength of the clamp member, mounting with an adhesive is difficult such that it becomes necessary to mount the clamp member by a mechanical mounting mechanism such as by thermally deforming a portion of the substrate of synthetic resin. With such mounting method, it is difficult to mount the clamp member on the disc-shaped recording medium to high accuracy. Moreover, the mounting process is complicated such that mounting cannot be achieved without considerable difficulties.

For increasing the frictional coefficient $\mu$ between the disc-shaped recording medium and the turntable, it may be envisaged to provide a material possibly increasing the frictional force, such as a rubber sheet or an O-ring, on the turntable. In such case, parallelism of the turntable surface supporting the disc-shaped recording medium cannot be maintained. If the disc-shaped recording medium is mounted on such turntable, a constant separation cannot be maintained between the disc-shaped recording medium and the recording and/or reproducing head. The reason may possibly be that the rubber sheet or the O-ring by nature cannot be worked or produced with a planar surface to micron-order smoothness, and that, when the disc-shaped recording medium is loaded in position on the turntable, the rubber sheet or the O-ring tends to follow the load in a partialized direction.

The disc-shaped recording medium having a substrate thickness of 1.2 mm but a diameter of 12 cm, or the thin-type disc-shaped recording medium, having a thin substrate thickness, such as AS·MO, is low in toughness such that it tends to be deformed, e.g., warped, due to temperature differential on storage. In particular, if the disc-shaped recording medium, improved in recording density by increasing the numerical aperture (NA) of the objective lens used for converging a light beam on the disc-shaped recording medium, has become deformed, such as by warping, even to the slightest extent, it cannot scan the desired recording track correctly by the light beam, such that it is no longer able to record and/or reproduce information signals correctly. In this consideration, the disc-shaped recording medium is desirably higher in toughness and exempt from becoming deformed, such as with warping.

Meanwhile, the relation between the thickness and strength against deformation in an optical recording medium is given by the following equation (3):

$$(\text{strength against deformation}) \propto (\text{thickness of the disc-shaped recording medium}) \qquad (3).$$

The disc-shaped recording medium, improved in recording density, needs to be exempt from deformation due to warping to a smaller extent than with the conventional disc-shaped recording medium, as may be seen from the following equation (4):

$$\text{skew tolerance} \propto \lambda/(NA)2 \qquad (4).$$

It is extremely difficult to have the warp of the disc-shaped recording medium e.g., within 0.4° in view of the skew tolerance. From this it follows that it is crucial to keep the parallelism of the turntable surface carrying the disc-shaped recording medium to maintain the distance between the disc-shaped recording medium and the recording and/or reproducing head.

DISCLOSURE OF THE INVENTION

It is therefore an object of the present invention to provide a novel disc-shaped recording medium capable of resolving the problem inherent in the conventional disc-shaped recording medium, and a method for the preparation thereof.

It is another object of the present invention to provide a disc-shaped recording medium capable of being loaded accurately and run in rotation on a turntable without producing eccentricities.

It is another object of the present invention to provide a disc-shaped recording medium which is strong against environmental changes and less susceptible to deformation, such as warping.

In one aspect, the present invention includes a disc-shaped recording medium including a substrate, a signal recording layer provided on one major surface of the substrate and a clamp member having a positioning unit at a center portion thereof, and formed of a material that can be magnetically attracted by a magnet. The clamp member is unified to the center portion of the substrate so that the surface of the clamp member will be flush with the surface of the substrate.

Preferably, the clamp member has a lug on an outer periphery thereof contacting the substrate. The clamp member is unified to the substrate with the lug nipping into the bulk portion of the substrate.

Preferably, the substrate is comprised of a core and a superficial portion provided at least between the core and the signal recording layer.

Preferably, the disc-shaped recording medium includes a light transmitting layer on a surface of the signal recording layer opposite to the surface thereof facing the substrate.

Preferably, the substrate includes a further superficial portion on a surface thereof opposite to a surface of the core facing the signal recording layer. This further superficial portion is formed of a synthetic resin or a resin composition having the water absorption coefficient not higher than 0.3%.

In another aspect, the present invention provides a method for the preparation of a disc-shaped recording medium including mounting a clamp member at a center portion of a metal mold unit, injecting a resin into the metal mold unit to mold a substrate and taking out the substrate unified to the clamp member when the resin injected into the metal mold unit is at a temperature not higher than the thermal deformation temperature.

On one surface of the substrate, taken out from the metal mold, a signal recording layer is formed to form the disc-shaped recording medium.

In the method for the preparation of the disc-shaped recording medium according to the present invention, the first resin material is injected into the metal mold to mold a superficial portion making up the substrate. After molding this superficial portion, the second resin material is injected into the metal mold to mold the core. The first resin material is then injected into the metal mold for molding a further superficial portion making up the substrate.

In still another aspect, the present invention provides a method for the preparation of a disc-shaped recording medium including mounting a clamp member at a center portion of a metal mold unit, heating the metal mold unit and subsequently placing a sheet member on the metal mold unit, pressuring the sheet member in a direction of pressure bonding the sheet member to the clamp member, and cooling the metal mold unit and subsequently peeling the sheet member unified to the clamp member from the metal mold unit. The metal mold unit is heated to a temperature higher than the glass transition temperature of the sheet member and subsequently the sheet member is placed on the metal mold unit.

Preferably, the metal mold unit is cooled to a temperature not higher than the glass transition temperature of the sheet member and subsequently the sheet member is peeled from the metal mold unit.

In yet another aspect, the present invention provides a disc-shaped recording medium including a substrate, a signal recording layer provided on one major surface of the substrate and a clamp member having a positioning unit at a center portion thereof, and formed of a material that can be magnetically attracted by a magnet. The clamp member is unified to the substrate at the time of molding the substrate.

Other objects, features and advantages of the present invention will become apparent from the following description of preferred embodiments thereof and the claims.

BEST MODE FOR CARRYING OUT THE INVENTION

Figure 1:
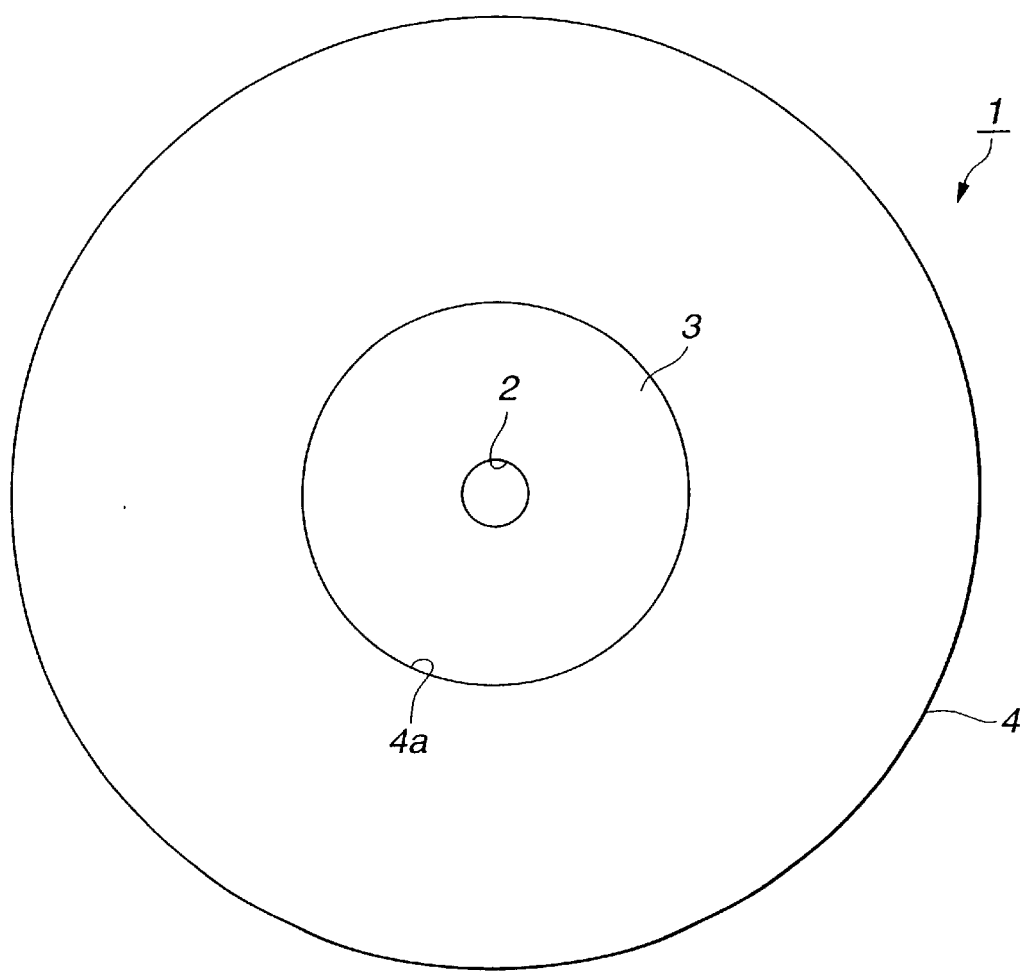
FIG. 1 is a plan view of a disc-shaped recording medium according to the present invention.

Referring to the drawings, a disc-shaped recording medium and the manufacturing method thereof according to the present invention will be explained in detail.

In the following, the materials making up the disc-shaped recording medium are explained. It should be noted that the present invention is not limited thereto and that the structure or material types of the respective thin films making up the recording medium may be selected depending on the objectives or performances desired of the disc-shaped recording mediums.

First, the present invention is explained with reference to a case in which a light beam is converged using an objective lens of a low numerical aperture (NA) to effect recording and/or reproduction of information signals.

Figure 2:
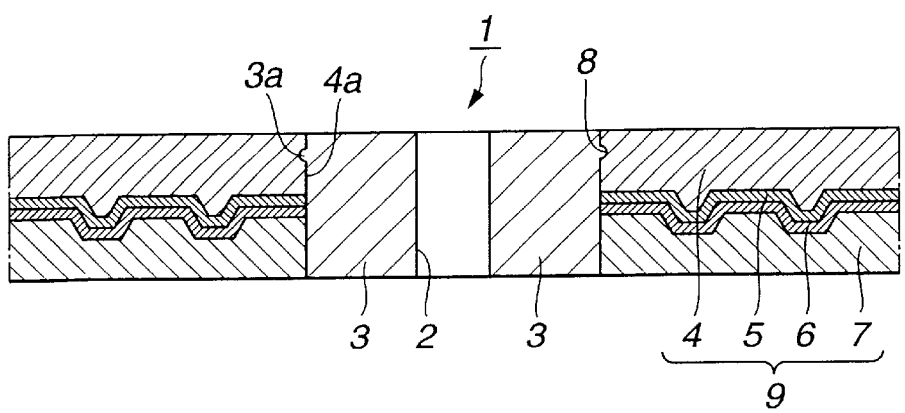
FIG. 2 is a cross-sectional view thereof.

Referring to FIGS. 1 and 2, this disc-shaped recording medium 1 includes a substrate 4 formed of glass or a synthetic resin exhibiting light transmitting property, such as polycarbonate resin. A signal recording layer 5, a light reflecting layer 6 and a protective film 7 are sequentially layered on this substrate 4 to form a signal recording section 9.

The substrate 4 making up the signal recording section 9 has a center opening 4a within which is mounted a clamp member 3 unified with the substrate 4. This clamp member 3 is magnetically attracted by a magnet provided on the turntable when the disc-shaped recording medium 1 is loaded on the turntable. The clamp member 3, magnetically attracted by a magnet provided on the turntable on loading the disc-shaped recording medium 1 on the turntable, is made up of a resin composition obtained on adding magnetic powders to a metal material or to a synthetic resin material to render the clamp member 3 magnetically attractive.

If the clamp member 3 is formed by a resin composition added to with resin powders, the synthetic resin material making up the resin composition is desirably the same material as that of the substrate 4. By forming the resin composition making up the clamp member 3 using the same synthetic resin material as the material making up the substrate 4, it is possible to unify the substrate 4 and the clamp member 3 strongly together on heating and pressurization.

With the clamp member 3, formed in this manner of the resin composition added to with magnetic powders magnetically attracted by the magnet, it is possible to increase the frictional coefficient between it and the turntable supporting the clamp member 3, so that, even in case the disc-shaped recording medium 1 is run in rotation at an elevated speed or precipitously decelerated in rotation, the disc-shaped recording medium is less likely to slip with respect to the turntable, thus assuring rotation of the disc-shaped recording medium 1 in timed relation to the turntable rotation. Since the slip between the clamp member 3 and the turntable is prevented from occurring, the signal recorded or reproduced in recording and/or reproduction of information signals may be exempted from jitter to assure error-free recording and/or reproduction of information signals. Moreover, it is possible to prevent the disc-shaped recording medium 1 from being partially scraped off by the turntable, due to the disc-shaped recording medium 1 slipping relative to the turntable, thus preventing the machining chips from becoming attached to e.g., the optical head to detract for recording and/or reproducing properties.

There is provided, at the center of the clamp member 3, mounted as one with the center area of the substrate 4, a center opening 2 which is engaged by a spindle shaft or a centering portion protuberantly formed centrally of the turntable when the disc-shaped recording medium 1 is loaded on the turntable making up a disc rotating driving mechanism for setting the loading position of the disc-shaped recording medium 1 with respect to the turntable.

In the inner peripheral surface of the center opening 4a formed in the substrate 4 for mounting the clamp member 3, there is formed a recess 8 in which is intruded a projection 3a formed on the outer peripheral surface of the clamp member 3. The clamp member 3 is mounted within the opening 4a as the projection 3a is intruded into the recess 8 so as to be safeguarded against incidental descent from the substrate 4 and so as to be positively unified to the substrate 4.

Meanwhile, the clamp member 3 is mounted within the center opening 4a flush with the substrate surface, as shown in FIG. 2. The clamp member 3, mounted flush with the substrate surface, can be formed to have a sufficient strength even if it is formed of a resin composition admixed with magnetic powders, whilst it can also be unified strongly to the substrate 4. Moreover, since the setting surface on the turntable of the clamp member 3 is flush with the substrate surface, the supporting area by the turntable can be increased to assure stable supporting of the disc-shaped recording medium 1.

The disc-shaped recording medium 1, constructed as described above, is loaded for rotation in unison with the turntable, with its center of rotation coincident with that of the turntable, by having the center opening 2 of the clamp member 3 engaged by the spindle shaft or the centering portion provided on the side turntable making up the disc rotating driving mechanism, and by having the clamp member 3 magnetically attracted by the magnet provided on the side turntable.

The clamp member 3 mounted on the disc-shaped recording medium 1 shown in FIGS. 1 and 2 is arranged at the outset in a metal mold unit used for molding the substrate 4, and is mounted as one with the substrate 4 in the course of molding the substrate, so that it can be mounted fixedly to high accuracy centrally of the substrate 5. The result is that the clamp member 3 can be mounted without offset centrally of the disc-shaped recording medium 1. With the disc-shaped recording medium 1 of the present invention, it was found experimentally that the eccentricities on rotation of the disc-shaped recording medium 1 loaded on the turntable can be suppressed to within 20 μm.

With the conventional disc-shaped recording medium, it was difficult to form the centering opening, engaged by the positioning member used for setting the loading position of e.g., the centering member, provided on the turntable, in loading the disc-shaped recording medium on the turntable, so that the center opening will be 8 mm or less in diameter. This is because the centering opening is formed simultaneously with the substrate. According to the present invention, the center opening 2 can be formed to a size of 1 mm in diameter. This is because the eccentricity in the disc-shaped recording medium 1 is reduced by the following reason. The result is that the disc-shaped recording medium 1 can be improved to a higher recording density.

Figure 3:
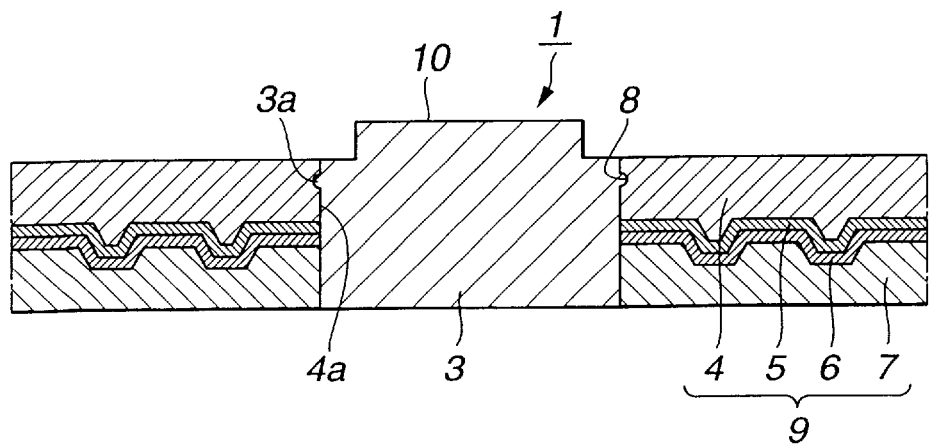
FIG. 3 shows another embodiment of the disc-shaped recording medium according to the present invention and more specifically shows the disc-shaped recording medium having an engagement projection centrally of the clamp member as positioning means in a cross-sectional view.

In the above-described disc-shaped recording medium, the clamp member 3 is provided with the center opening 2 for positioning the disc-shaped recording medium loaded on the turntable, this center opening 2 being engaged by a positioning member on the turntable, such as a spindle shaft. Alternatively, the loading position can be set by a center engaging projection 10 of the clamp member 3 engaging in an engaging recess formed centrally of the turntable, as shown in FIG. 3.

In the disc-shaped recording medium 1, described above, a supporting surface 3b of the clamp member 3 supported by the clamp member 3 is again flush with one of the surfaces of the substrate 4. The clamp member 3 is mounted in the center opening 4a so that its both surfaces will be flush with both surfaces of the substrate 4.

Moreover, in the disc-shaped recording medium of the present invention, plural grooves 11 extending radially from the center may be equiangularly formed in the inner rim of the center opening 2 of the clamp member 3.

Figure 4:
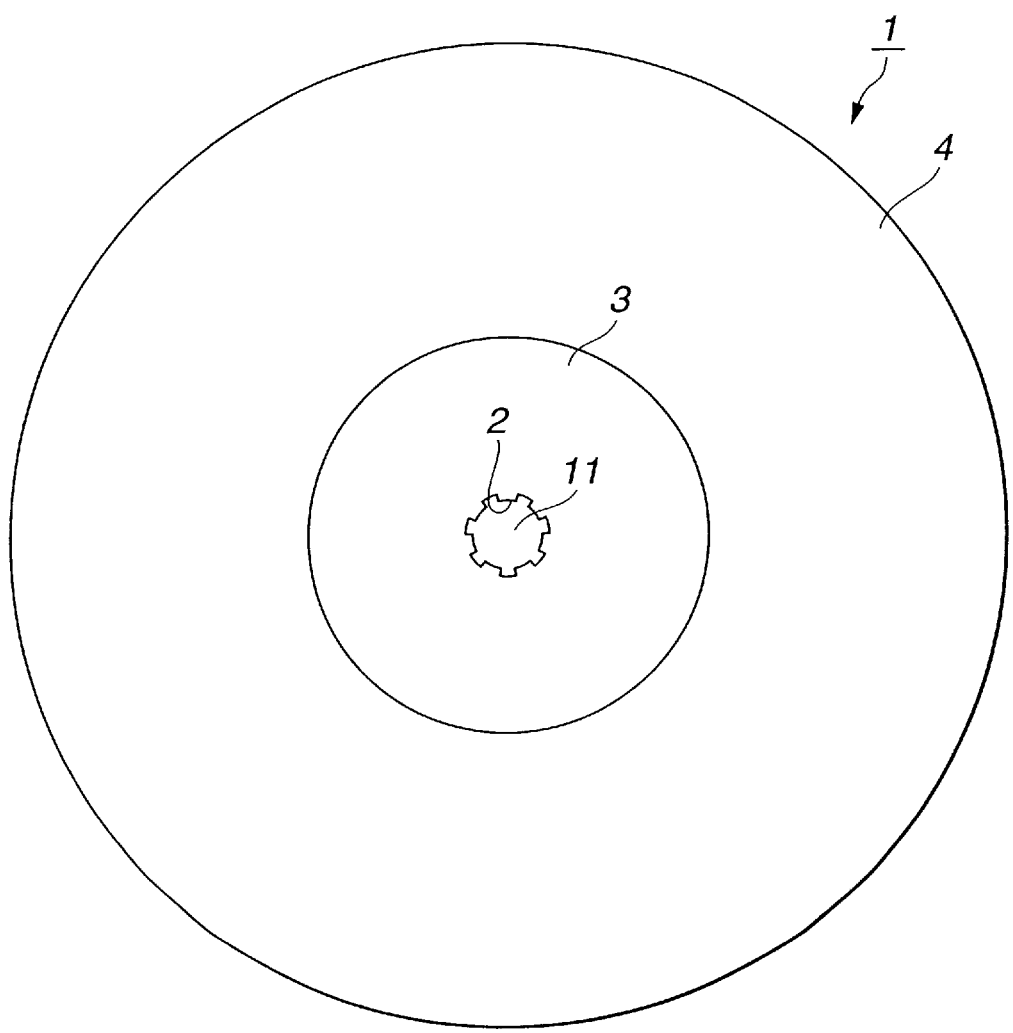
FIG. 4 shows still another embodiment of the disc-shaped recording medium according to the present invention and more specifically shows plural grooves formed for extending radially in the inner peripheral surface of a center hole provided in a clamp member.

The turntable loaded with the disc-shaped recording medium 1 shown in FIG. 4 may also be formed with projections engaged in the grooves 11 on the outer peripheral surface of the projection 10 engaged in turn in the center opening 2. By the projections on the turntable engaging in the grooves 11 for loading the disc-shaped recording medium 1, the force of friction produced between the disc-shaped recording medium 1 and the turntable is increased further on rotationally driving the disc-shaped recording medium 1. This effectively prevents the slipping otherwise caused on controlling the rpm during rotation of the disc-shaped recording medium 1 at an elevated velocity or at CLV.

By forming a gear on the outer peripheral surface of the engagement projection 10 shown in FIG. 3, or by roughing this outer peripheral surface, the disc-shaped recording medium 1 can be loaded with a stronger bonding force on the turntable, such that it becomes possible to prevent generation of slipping otherwise caused on controlling the rpm during rotation of the disc-shaped recording medium 1 at an elevated velocity or at CLV.

The substrate 4 of the above-described disc-shaped recording medium 1 represents a light transmitting layer on which falls a light beam illuminated for recording information signals on the signal recording section 9 or reading out the information signals recorded on the signal recording section 9. Specifically, a light beam, that is the laser light, radiated from the optical head of the recording and/or reproducing apparatus, in a manner not shown, is illuminated on the substrate as the light bean is converged by an objective lens of the optical head on the substrate 4 and conducted to the recording pits formed on an information recording layer 5 as later explained. This substrate 4 is formed of a synthetic resin, such as polycarbonate resin or amorphous polyolefin resin. Preferably, the synthetic resin forming the substrate 4 is optically transparent, with its refractive index being within 1.55±0.1 and with its transmittance being not lower than 80%. On a surface of the substrate 4 opposite to the substrate surface illuminated by the laser light, there are formed a pre-groove for guiding the laser light illuminated on the disc-shaped recording medium 1 in recording the information signals for constituting the signal recording section 9, and the signal recording layer 5, by a technique such as sputtering.

The synthetic resin of the substrate 4 is of the water absorption coefficient preferably not higher than 0.3% and more preferably not higher than 0.15%. If the water absorption coefficient is not less than 0.3%, water absorption or desorption from one side of the substrate 4 becomes significant as a result of changes in temperature or humidity, with the result that the substrate 4 molded is warped or otherwise deformed to detract from recording and/or reproducing characteristics.

The signal recording layer 5 and the protective film 7 are generally lower in water absorption coefficient than the substrate 4. Thus, in a high humidity environment, the disc-shaped recording medium 1 is deformed so that the disc-shaped recording medium 1 is concave on the side signal recording layer 5. Conversely, in a low humidity environment, the disc-shaped recording medium 1 is deformed so that the disc-shaped recording medium 1 is convexed on the side signal recording layer.

Should the disc-shaped recording medium 1 be loaded on the recording and/or reproducing apparatus for recording and/or reproducing information signals, the disc-shaped recording medium 1 tends to become deformed, because the surrounding atmosphere in the recording and/or reproducing apparatus is elevated in temperature due to heat evolution from a driving motor or from components making up the recording/apparatus, with the humidity being then decreased correspondingly. Should the disc-shaped recording medium 1 be deformed as described above, the information signals recorded may be unable to be reproduced or similar malfunctions tend to be produced.

In the case of an optical disc, as a disc-shaped recording medium, in which the substrate 4 is as thin in thickness as approximately 0.1 mm and the numerical aperture (NA) of the objective lens is as high as 0.8 or even higher to effect high density recording and/or reproduction, referred to below as a DVR disc, it is necessary to suppress warping deformation to 4° or less. To this end, the water absorption coefficient of the synthetic resin making up the substrate 4 is desirably 0.3% or less and more desirably 0.15% or less. In consideration of fluctuations in the quality of the DVR disc, caused during the manufacture, or fluctuations in the environment under which the DVR disc is stored or used, the water absorption coefficient of the resin making up the substrate 4 is most desirably 0.1% or less.

If the water absorption coefficient is 0.1% or less, it is only sufficient if the deformation in manufacturing a DVR disc is suppressed, it being unnecessary to take the environment of using or storing the disc into account. This increases the system margin, such as skew margin, at the time of recording and/or reproducing a DVR disc.

The signal recording layer 5 is formed by, for example, a thin film of an amorphous alloy, such as Tb—Fe—Co, or a recording film of a chalcogenide-based phase change material, such as Ge—Se—Te, In—Se—Te or $Sb_2Se_3$ or $Bi_2Te_3$.

The signal recording layer 5 is an area in which recording pits are formed in a groove or on a land by the laser light illuminated from an optical head, not shown, through the substrate 4 in a focused state to record information signals. By a recording and/or reproducing apparatus, not shown, used for this disc-shaped recording medium 1, the information signals may be recorded on the signal recording layer 5, or the information signals already recorded on the signal recording layer 5 may be reproduced.

The light reflecting layer 6 is formed for layering on the signal recording layer 5, as lining the signal recording layer 5, with Al or an Al-containing alloy. The light reflecting layer 6 reflects the laser light diffracted by recording bits corresponding to information signals recorded on the signal recording layer 5. The laser light so reflected is detected by a detector of an optical head, not shown, for reading out information signals recorded on the disc-shaped recording medium 1. Meanwhile, the light reflecting layer 6 may be formed of materials other than Al, such as Ag or Au, having high reflectance.

The protective film 7 is formed on the light reflecting layer 6 for protecting the signal recording layer 5 or the light reflecting layer 6.

The clamp member 3 is formed centrally of the disc-shaped recording medium 1 so that its upper and lower end faces will be flush with the upper and lower surfaces of the disc-shaped recording medium 1, as shown in FIG. 2. The clamp member 3 has a lug 3a, continuous or interrupted, formed for projecting from the outer peripheral surface of the clamp member 3, in order to prevent the clamp member 3 from becoming peeled off from the substrate 4 due to contraction of the synthetic resin during the preparation of the disc-shaped recording medium 1. Thus, when the clamp member 3 is mounted in the center opening 4a of the substrate 4, the lug 3a is engaged in the recess 8 formed in the inner peripheral surface of the center opening 4a to improve the bonding force between the clamp member 3 and the substrate 4.

In an embodiment shown in FIGS. 2 and 3, the lug 3a is formed at a position offset towards the substrate 4, that is at a position of the clamp member 3 contacting the substrate 4, from the center of thickness of the disc-shaped recording medium 1. The reason is that, with the upper surface in the drawing of the substrate 4 routinely serving as a setting surface for the turntable, the force acting for peeling the clamping member 3 from the substrate 4 caused by a force acting on the clamp member 3 in case of slipping is decreased.

In the above-described disc-shaped recording medium 1, the lug 3a is formed on the outer peripheral surface of the clamp member 3. Alternatively, a recess may be formed in place of the lug 3a. If such recess is formed, the bonding force between the clamp member 3 and the substrate 4 is improved by the synthetic resin materials of the clamp member 3 and the substrate meshing with each other.

In reproducing the disc-shaped recording medium 1, such as the aforementioned CD or DVD, having the numerical aperture (NA) not larger than 0.6, a laser light beam A is illuminated on the disc-shaped recording medium 1 through an objective lens 12 of an optical head provided on a recording and/or reproducing apparatus, not shown. The laser light A illuminated as it is converged by the objective lens 12 is transmitted through the substrate 4 and the information recording layer 5 and reflected by the light reflecting layer 6 to outside the substrate 4 so as to fall on the optical head through the objective lens 12. The laser light reflected by the light reflecting layer 6 has been diffracted by recording bits corresponding to information signals recorded on the signal recording layer 5. The laser light reflected in this manner by the light reflecting layer 6 is detected by a photodetector provided on an optical head of the recording and/or reproducing apparatus, and the signals so detected are then decoded to reproduce the information signals recorded on the disc-shaped recording medium 1.

As may be seen from the above-described explanation, the disc-shaped recording medium 1 is formed by the substrate 4 and the clamp member 3 so that these will be flush with each other, as shown for example in FIG. 2. On the other hand, the clamp member 3 in the disc-shaped recording medium 1 is mounted centrally of the metal mold unit at the outset in preparing the disc-shaped recording medium 1, as later explained, and the substrate 4 is formed in this state, so that the clamp member 3 may be mounted to high accuracy centrally of the disc-shaped recording medium 1. This diminishes the eccentricity produced by a mounting error between the disc-shaped recording medium 1 and the clamp member 3 to evade the eccentricity ascribable to the mounting error between the disc-shaped recording medium 1 and the clamp member 3 to prevent the risk of the tracking servo being disengaged or of the load being applied to a spindle shaft of a spindle motor during recording and/or reproduction.

By forming the clamp member 3 of a synthetic resin material admixed with a magnetic material, the disc-shaped recording medium 1 is less susceptible to slip in case of high-speed rotation or decelerated rotation. Since the slipping is less liable to occur, the disc-shaped recording medium 1 is prevented from being scraped due to the relative rotational error between the disc-shaped recording medium 1 and the turntable to prevent the situation of machining chips from the disc-shaped recording medium 1 becoming affixed to the signal recording section 9 to cause errors in recording and/or reproduction.

Figure 5:
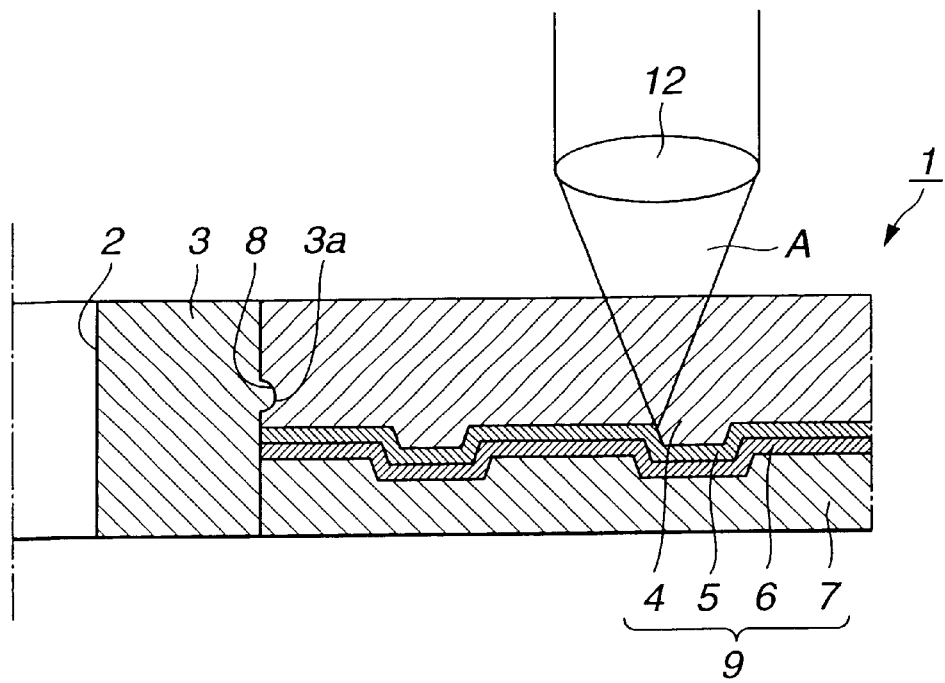
FIG. 5 is a schematic view showing the disc-shaped recording medium shown in FIGS. 1 and 2 as it is being reproduced.

A disc-shaped recording medium 20 useful in application to e.g., the aforementioned DVR disc of high recording density with the numerical aperture NA of the objective lens 12 shown in FIG. 5 being 0.8 is hereinafter explained. This disc-shaped recording medium 20 features a substrate being of a three-layered structure, as will be explained subsequently.

Figure 6:
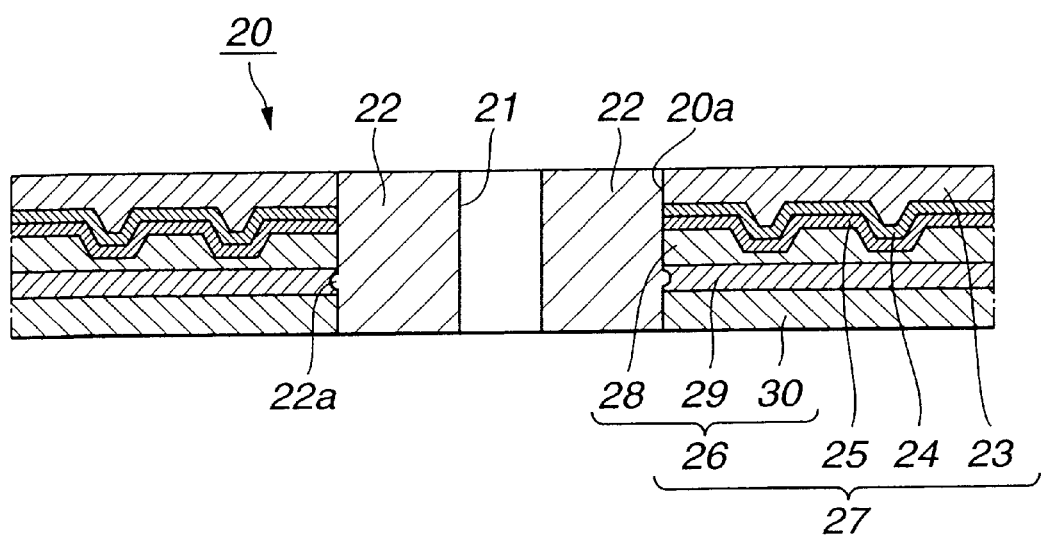
FIG. 6 is a cross-sectional view showing a disc-shaped recording medium having a three-layered substrate structure according to the present invention.

In a center opening 20a of a disc-shaped recording medium 20, configured for achieving a high recording density, there is mounted a clamp member 22 having a center opening 21, as shown in FIG. 6. In this disc-shaped recording medium 20, a light transmitting layer 23, a signal recording layer 24, and a light reflecting layer 25 are layered sequentially on a substrate 26 to form a signal recording section 27, as shown in FIG. 6.

Meanwhile, in the disc-shaped recording medium 20, shown in FIG. 6, the center opening 21, clamp member 22, signal recording layer 24 and the light reflecting layer 25 are equivalent to the center opening 2, clamp member 3, signal recording layer 5 and to the light reflecting layer 6, and hence are not explained specifically.

The light transmitting layer 23 is formed by, for example, a thin film of a UV curable resin, an optically transparent resin sheet or a glass sheet. The laser light illuminated in a converged state from an optical head, not shown, of a recording and/or reproducing apparatus is transmitted through the light transmitting layer 23 and allowed to proceed towards the signal recording layer 24 as later explained. The material used for forming the light transmitting layer 23 needs to be of a refractive index within 1.55±0.1, with the transmittance being not less than 80%.

In distinction from the above-described disc-shaped recording medium 1, the light transmitting layer 23 of the disc-shaped recording medium 20 is formed on a substrate 26, without forming a substrate in producing the disc-shaped recording medium 20.

The substrate 26 used includes a first superficial layer 28, a core 29 and a second superficial layer 30.

The first superficial layer 28 is preferably formed of a resin composition having superior transcription characteristics for recording pits corresponding to information signals formed as recesses in a stamper in the first superficial layer 28. The second superficial layer 30 is formed of the same material as the material making up the first superficial layer 28. By sandwiching the core 29 by the first and second superficial layers 28, 30 formed of the same material, the amount of the deformation of the first and second superficial layers 28, 30 can be equated on the front and rear surfaces of the core 29.

The core 29 is preferably formed of a resin composition having a higher internal loss and higher tenacity and resonance characteristics than those of the first and second superficial layers 28, 30. The core 29 and the clamp member 22 are strongly unified together by the lug 22a on the outer peripheral surface of the clamp member 22 meshing with the core 29, as in the above-described disc-shaped recording medium 1, to prevent peeling. In this case, the lug 22a is provided on the outer periphery of the clamp member 22 contacting the core 29.

For improving the tenacity of the first and second superficial layers 28, 30, it is sufficient if the resin composition making up the first and second superficial layers 28, 30 be admixed with a material of higher tenacity. For improving the infernal loss of the first and second superficial layers 28, 30, it is sufficient if the resin composition making up the first superficial layer 28 be admixed with a material exhibiting high internal loss. The internal loss of the first and second superficial layers 28, 30 can also be increased by forming a sea-island structure or the layered structure along with the hetero polymers.

Meanwhile, it is unnecessary for the synthetic resin material making up the first superficial layer 28, core 29 and the second superficial layer 30 to be an optically transparent material.

Since the substrate 26 is of the three-layered structure, the disc-shaped recording medium 20 is of high tenacity and resonance characteristics. Thus, the disc-shaped recording medium for high density recording is less susceptible to warping due to changes in temperature and humidity on loading on the recording and/or reproducing apparatus or on storage so that recording medium is less susceptible to errors in recording and/or reproduction.

Figure 7:
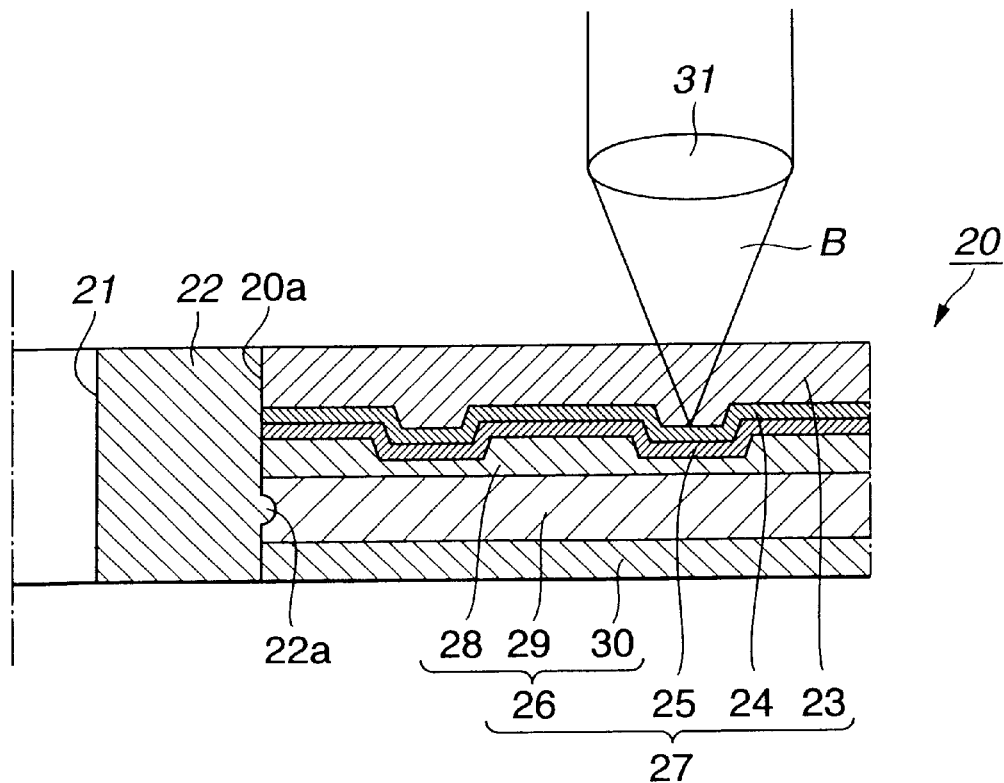
FIG. 7 is a schematic view showing the disc-shaped recording medium shown in FIG. 6. as it is being reproduced.

In reproducing the disc-shaped recording medium 20, the laser light B is illuminated on the signal recording layer 24 through the light transmitting layer 23 as it is converged by an objective lens 31 of the recording and/or reproducing apparatus, not shown, as shown in FIG. 7.

The laser light B illuminated on the recording medium 20 as it is converged by the objective lens 31 by an optical head provided on an optical head, not shown, is transmitted through the light transmitting layer 23 and the signal recording layer 24 so as to be reflected by the light reflecting layer 25. The laser light reflected by the light reflecting layer 25 is reflected to outside the light transmitting layer 23 so that it falls on the optical head, not shown, through the objective lens 31. At this time, the laser light reflected by the light reflecting layer 25 has been diffracted by recording pits corresponding to the information signals. The laser light reflected by the light reflecting layer 25 is detected by a photodetector provided on an optical head of a recording and/or reproducing apparatus. An output of the photodetector is decoded to reproduce the information signals.

The disc-shaped recording medium 20 for high density recording according to the present invention is formed so that the substrate 26 and the clamp member 22 will be flush to each other, as shown in FIGS. 6 and 7. Since the clamp member 22 in the disc-shaped recording medium 20 is mounted centrally of the metal mold unit at the outset when preparing the disc-shaped recording medium 20, as will be explained subsequently, the clamp member 22 is mounted correctly centrally of the metal mold. Thus, it is possible to reduce the eccentricity ascribable to mounting errors between the disc-shaped recording medium 20 and the clamp member 22. Since the load imposed on the spindle shaft of the spindle motor in recording and/or reproduction can be reduced, it is possible to reduce the occurrence of errors in recording and/or reproduction.

By forming the clamp member 22 of a magnetic material, similarly to the clamp member 3, the turntable and the disc-shaped recording medium are less susceptible to slip between the turntable and the disc-shaped recording medium in case of high speed rotation and decelerated rotation. Since the slip is less likely to occur, it is possible to prevent the disc-shaped recording medium 20 from being scraped due to relative rotational error between the disc-shaped recording medium 1 and the turntable to prevent machining chips from the disc-shaped recording medium 20 from becoming affixed to the signal recording section 27 to cause errors to be produced in recording or reproduction.

Moreover, in the disc-shaped recording medium, the core 29 making up the substrate 26 is formed of a tough material so that it is not likely to be warped or otherwise deformed, thus decreasing errors from being produced in recording or reproduction.

Figure 8:
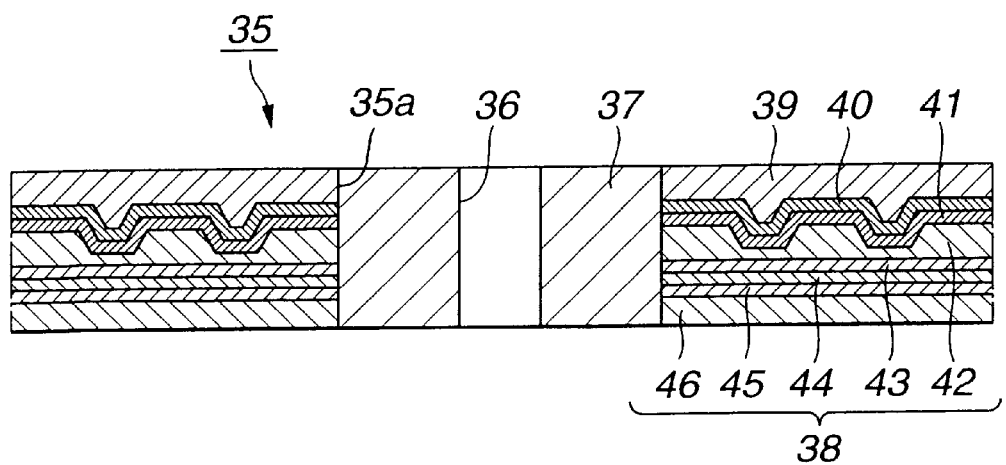
FIG. 8 is a cross-sectional view showing a disc-shaped recording medium having a five-layered substrate structure according to the present invention.

The substrate of the disc-shaped recording medium according to the present invention may be of a five-layered structure as shown in FIG. 8. In this disc-shaped recording medium, a clamp member 37 having a center opening 36 is mounted in a center opening 35a formed in a disc-shaped recording medium 35. In this disc-shaped recording medium 35, a light transmitting layer 39, a signal recording layer 40 and a reflecting layer 41 are formed sequentially on a substrate 38, as shown in FIG. 8. A substrate 38 making up the present disc-shaped recording medium 35 includes a first superficial layer 42, a core 45 and a second superficial layer 46, layered sequentially, as shown in FIG. 8. That is, the disc-shaped recording medium 35, shown in FIG. 8, is of the same structure as the recording medium 20 shown in FIGS. 6 and 7, except that the substrate 8 is of the five-layered structure, and hence is not explained in detail.

The substrate making up the disc-shaped recording medium may be of a multi-layered structure comprised of a larger number of layers, such as three or more layers, provided that it is of a layered structure comprised of the same sort of a resin material. By forming the respective layers of the same resin material, respective layers or members may be bonded together on heating and pressuring despite changes in fluidity. Thus, it becomes possible to form superficial portions on the side light transmitting layer and the core of a resin having superior transcription characteristics of recording pits corresponding to information signals recorded on a stamper, and of a resin having superior toughness and resonance properties, respectively, while it is also possible to layer the superficial portions and the core together to complete a substrate. Meanwhile, if the substrate is of multiple layers of more than three layers, it is formed by a hot press and a dedicated metal mold.

By forming the clamp member of a material comprised of a mixture of the same synthetic resin making up the substrate and a magnetic material, a disc-shaped recording medium comprised of the clamp member and the signal recording layer unified together can be formed not by injection molding but by a dedicated metal mold unit by pressuring and heating. This allows to reduce the eccentricity caused by mounting tolerance of the disc-shaped recording medium and the clamp member further.

The manufacturing method for the above-described disc-shaped recording mediums 1, 20 is hereinafter explained.

First, the manufacturing method for the disc-shaped recording medium 1 in producing the disc-shaped recording medium 1 by injection molding is explained.

Figure 9:
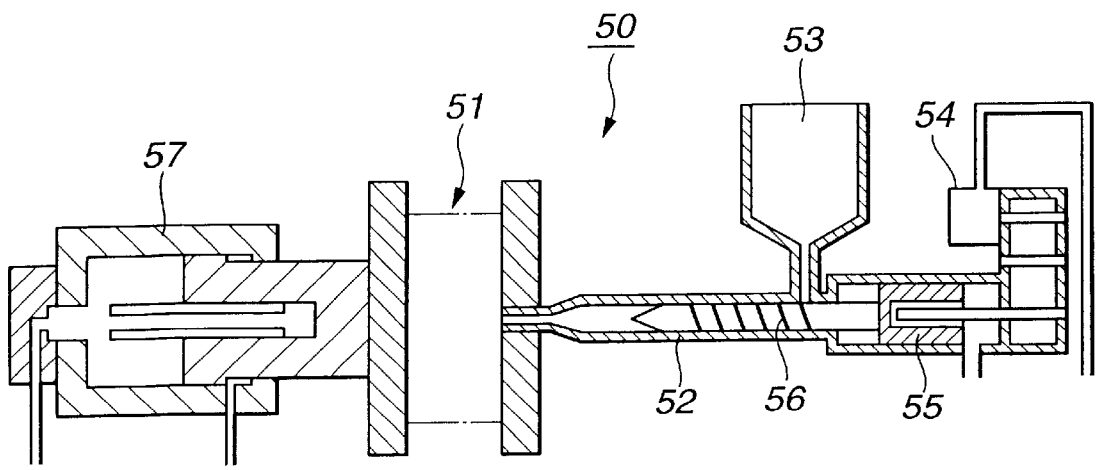
FIG. 9 is a cross-sectional view showing an injection molding device used for molding the disc-shaped recording medium according to the present invention.
Figure 10:
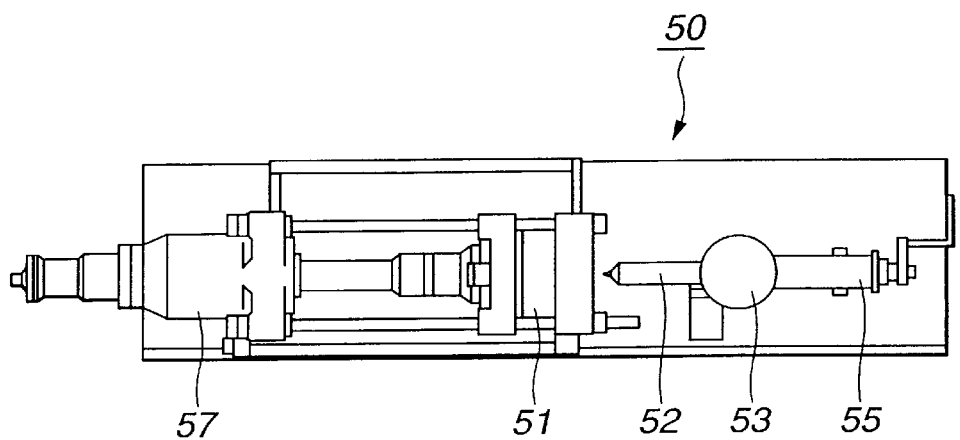
FIG. 10 is a plan view thereof.

An injection molding device 50 used for manufacturing the substrate is now explained. Referring to FIGS. 9 and 10, the injection molding device 50 includes a metal mold unit 51, an injection unit 52, a hopper 53, a hydraulic motor 54, a hydraulic cylinder 55, a screw 56 and a mold unit tightening cylinder 57.

Figure 11:
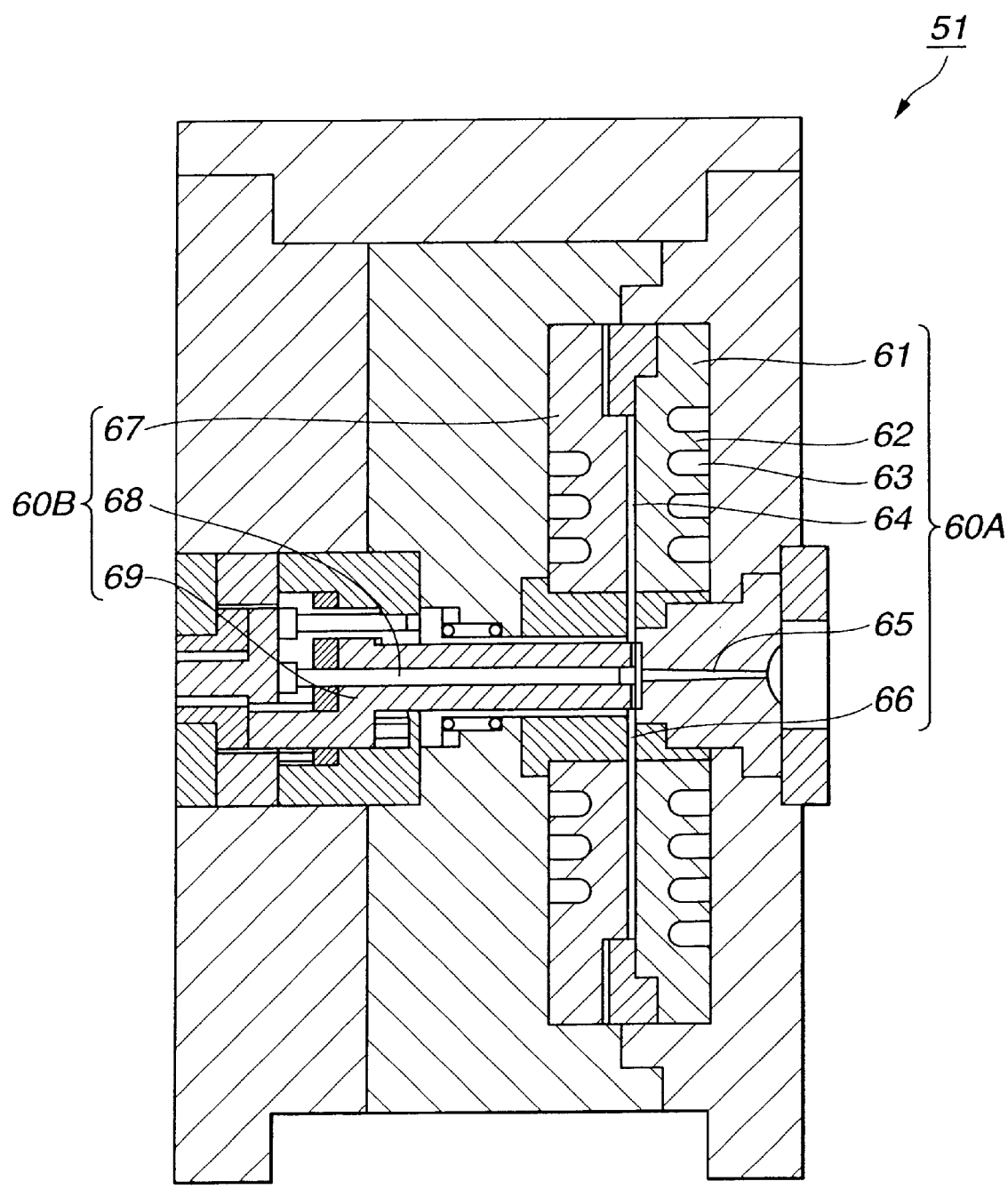
FIG. 11 is an enlarged cross-sectional view showing a metal mold unit constituting an injection molding device.

The mold unit tightening cylinder 51 serves as a metal mold unit for molding the substrate 4 in the disc-shaped recording medium 1. The metal mold unit 51 is made up of a fixed metal mold unit 60A and movable metal mold unit 60B, as shown in FIG. 11.

Figure 12:
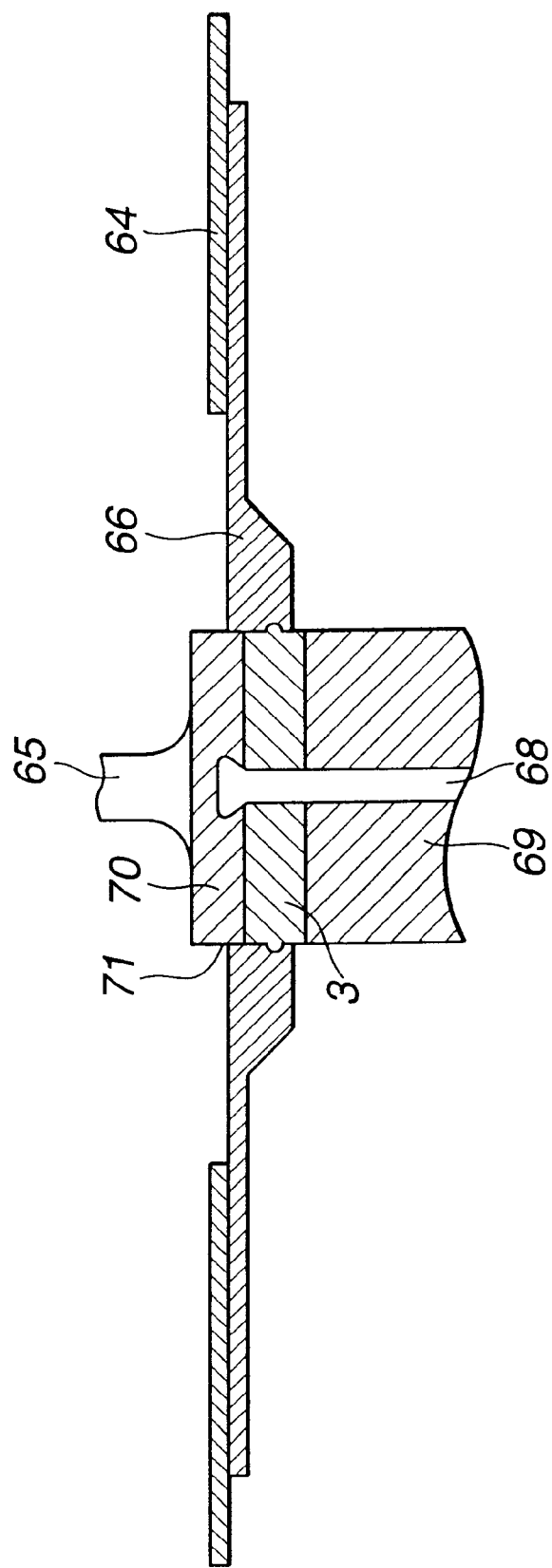
FIG. 12 is an enlarged cross-sectional view showing the periphery of a centering pin in a metal mold unit prior to gate cutting.
Figure 13:
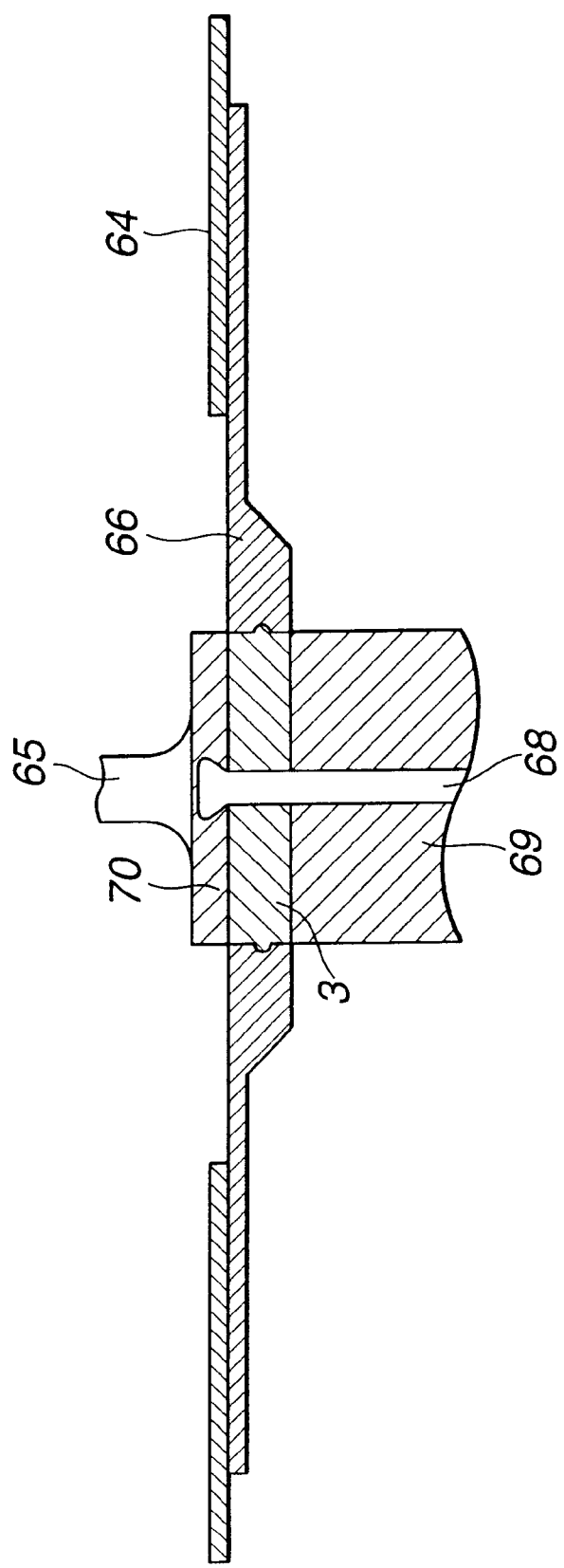
FIG. 13 is an enlarged cross-sectional view showing the periphery of the centering pin in the metal mold unit subsequent to gate cutting.

The fixed metal mold unit 60A includes an outer ring 61, a fixed mirror 62, a fixed temperature adjustment circuit 63, a stamper 64, a sprue 65, and a cavity 66. The movable metal mold unit 60B includes a movable mirror 67, a center positioning pin 68 and a gate cut punch 69. Referring to FIG. 12, a land 70 is provided in the sprue 65. The fixed temperature adjustment circuit 63 is used for adjusting the temperature of the fixed metal mold unit 60A e.g., by flowing hot water so that the fixed metal mold unit 60A will be at a pre-set temperature suited to injection molding.

First, in molding the substrate 4, the clamp member 3 is mounted on the center positioning pin 68. Then, a molten resin, as a material for the substrate 4, is injected through the sprue 65 from the injection unit 52, as later explained, under a pre-set pressure, into an inner space of the fixed metal mold unit 60A and the movable metal mold unit 60B. As the charged resin is not as yet solidified, the clamp member 3 projects the center positioning pin 68 and the gate cut punch 69 from the mold unit tightening cylinder 57 into the land 70. At this time, the gate 71 is sealed as it is severed.

This unifies the clamp member 3 and the substrate 4 together to complete a basic structure of the disc-shaped recording medium 1 in which the clamp member 3 and the substrate 4 are flush relative to each other. On one surface of the substrate 4 is coated a material of the signal recording layer 5 such as by sputtering, and a material forming the signal recording layer 5 is similarly coated on one surface of the substrate 4, such as sputtering. Finally, the protective film 7 is formed to complete the disc-shaped recording medium 1.

By preparing the substrate 4 by the method described above, it becomes possible to prevent insufficient transcription of the crest and recess pattern in the stamper due to sink caused by volumetric contraction as the injected resin is solidified. The reason is that, should the resin of the substrate 4 be solidified to cause volumetric contraction, any excess resin which has flown into the land 70 flows into the cavity 66 to maintain a constant pressure in the cavity 66.

At this time, a stamper 64 for forming pits and grooves is mounted in the fixed metal mold unit 60A. By this stamper 64, pits or grooves are formed on one surface of the substrate 4 making up the disc-shaped recording medium 1.

The injection unit 52 serves for injecting a resin as a material which is to form the substrate 4 in the disc-shaped recording medium 1. The injection unit 52 is connected to the hopper 53 as later explained. The injection unit 52 includes a heater, not shown, for heating the resin supplied from the hopper 53. The injection unit 52 ejects the molten resin from its distal end into the metal mold unit 51.

The hopper 53 receives a material which is to form the disc-shaped recording medium 1, such as resin pellets, and has the function of furnishing the injected resin to the injection unit 52.

The hydraulic motor 54 furnishes oil for applying the hydraulic pressure to the hydraulic cylinder 55 as later explained. As the hydraulic motor 54 is driven to inject oil into the hydraulic cylinder 55 to set the hydraulic cylinder 55 into operation. The hydraulic cylinder 55 is set into operation by oil injection by the hydraulic motor 54 to cause movement of the screw 56 as later explained. By such movement of the screw 56, the molten resin injected into the hopper 53 and subsequently into the injection unit 52 is extruded into the metal mold unit 51.

The screw 56 is moved within the injection unit 52 to extrude the molten resin injected into the hopper 53 to extrude the molten resin supplied to the injection unit 52 towards the metal mold unit 51.

The mold unit tightening cylinder 57 is configured for pressuring the metal mold unit 51 to a pre-set pressure after the resin which is to form the substrate 4 of the disc-shaped recording medium 1 has been injected into the metal mold unit 51. By pressuring the metal mold unit 51 to a pre-set pressure, the resin injected into the metal mold unit 51 is molded to give the substrate 4, while the clamp member 3 and the substrate 4 are substantially flush with each other and unified together. The lug 3a of the clamp member 3 meshes with the substrate 4 at this time to prevent the clamp member 3 from descending from the substrate 4 as well as to prevent the clamp member 3 from rotating relative to the substrate 4.

The resin as a material which is to form the substrate 4 in the disc-shaped recording medium 1 is first injected into the metal mold unit 51 and thence supplied to the injection unit 52 where it is melted. The hydraulic motor 54 then is actuated to cause movement of the hydraulic cylinder 55. The screw 56 is then moved to cause movement of the molten resin to inject the molten resin into the metal mold unit 51. The clamp member 3 is mounted at the outset to a centering pin 58.

Then, a pre-set pressure is applied to from the mold unit tightening cylinder 57 to the metal mold unit 51 to complete the substrate 4. At this time, the major surface of the substrate 4 is substantially flush with that of the clamp member 3, with the substrate 4 being unified to the clamp member 3. The fixed metal mold unit 60A then is allowed to cool by the fixed temperature adjustment circuit 63. When the molten resin injected into the metal mold unit 51, that is the resin injected into and melted in the metal mold unit 51, is at temperature not higher than the heat molding temperature, the substrate 4 is peeled off from the stamper 64 and taken out of the metal mold unit 51. Since the lug 3a of the clamp member 3 meshes with the substrate 4 at this time, there is no risk of the clamp member 3 from becoming detached from the substrate 4.

The substrate 4 of the disc-shaped recording medium 1 is prepared by injection molding by the injection molding device 50.

By injection molding the substrate 4 as described above, it becomes possible to suppress the signal of the stamper 64 in the disc-shaped recording medium 1 and true circularity of the clamp member 3 to within the mounting clearance of the clamp member 3 to the metal mold unit 51. This allows to provide a disc-shaped recording medium as free from eccentricity as possible. Since the labor of subsequently bonding the clamp member 3 to the disc-shaped recording medium 1 may be dispensed with, it becomes possible to simplify the manufacturing process of the disc-shaped recording medium 1 to improve the productivity.

On one surface towards the outer peripheral side of the injection-molded substrate 4, carrying the clamp member 3, the signal recording layer 5 and the light reflecting layer 6 are deposited or formed, and the protective film 7 formed e.g., of a UV curable resin is layered on the light reflecting layer 6. This completes the disc-shaped recording medium 1.

With the above-described manufacturing method for the disc-shaped recording medium 1, it is possible to unify the clamp member 3 and the substrate 4 together. This allows to provide the disc-shaped recording medium 1 in which it is possible to suppress eccentricity and to prevent slipping from occurring.

Referring to FIGS. 6 and 7, the manufacturing method for the disc-shaped recording medium 20 shown in FIGS. 6 and 7 is explained.

Figure 14:
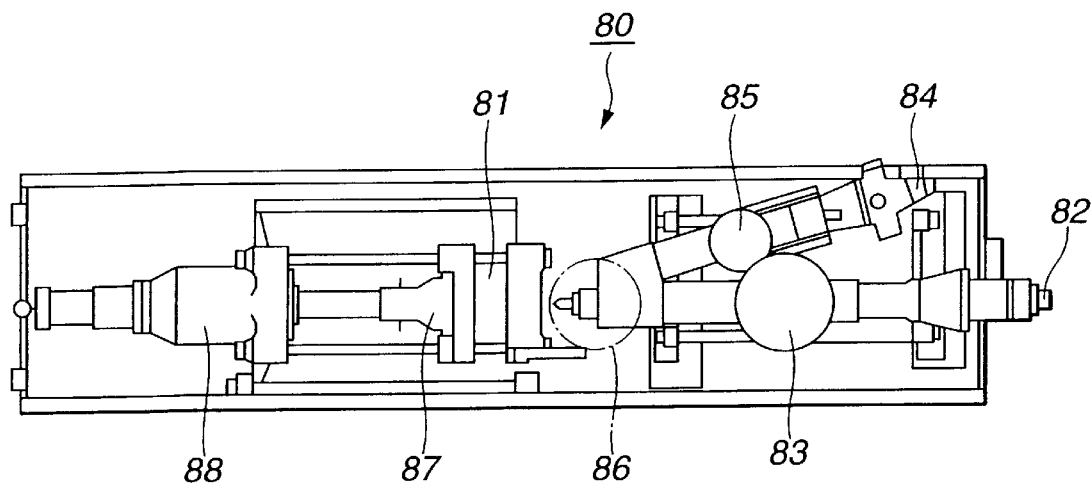
FIG. 14 is a plan view showing an injection molding device used for molding the disc-shaped recording medium according to the present invention.

An injection molding device 80 used for manufacturing the disc-shaped recording medium 20, shown in FIGS. 6 and 7, is now explained. Referring to FIGS. 14, the injection molding device 80 includes a metal mold unit 81, a first injection unit 82, a first hopper 83, a second injection unit 84, a second hopper 85, a nozzle 86, a mold unit tightening piston 87 and a mold unit tightening cylinder 88.

The mold unit tightening cylinder 81 serves as a metal mold unit for molding the substrata 4 in the disc-shaped recording medium 20. The metal mold unit 81 is of the same structure as the metal mold unit 51 in the injection molding device 50. That is, the metal mold unit 81 is of the same structure as the structure shown in FIG. 11. The metal mold unit 81 is arranged in register with a nozzle 86 as later explained. The metal mold unit 81 is held by actuating the mold unit tightening piston 87 by the mold unit tightening cylinder 88 as later explained.

The first injection unit 82 serves for injecting a material which is to form the first superficial layer 28 and the second superficial layer 30 of the substrate 26 by the first screw which will be explained later. The first injection unit 82 is connected to the first hopper 83 as later explained. The first injection unit 82 includes a heater, not shown, and heats and melts the material furnished from the first hopper 83. The first injection unit 82 then injects the molten material through the nozzle 86 as later explained to the metal mold unit 81.

The first hopper 83 receives a material which is to form the first and second superficial portions 28, 30 of the disc-shaped recording medium 20, and furnishes the charged material to the first injection unit 82.

The second injection unit 84 serves for the material which is to form the core 28 of the substrate 26 in the disc-shaped recording medium 20 by the second screw as later explained. The second injection unit 84 is connected to the second hopper 85 as later explained. The second injection unit 84 includes a heater, not shown, and heats and melts the molding material, such as resin, furnished from the second hopper 85. The molten material is injected through the nozzle 86, as later explained, to the metal mold unit 81.

The second hopper 85 receives the material for molding the first and second superficial portions 28, 30 of the disc-shaped recording medium 20, and furnishes the material, so furnished, to the second injection unit 84.

Figure 15:
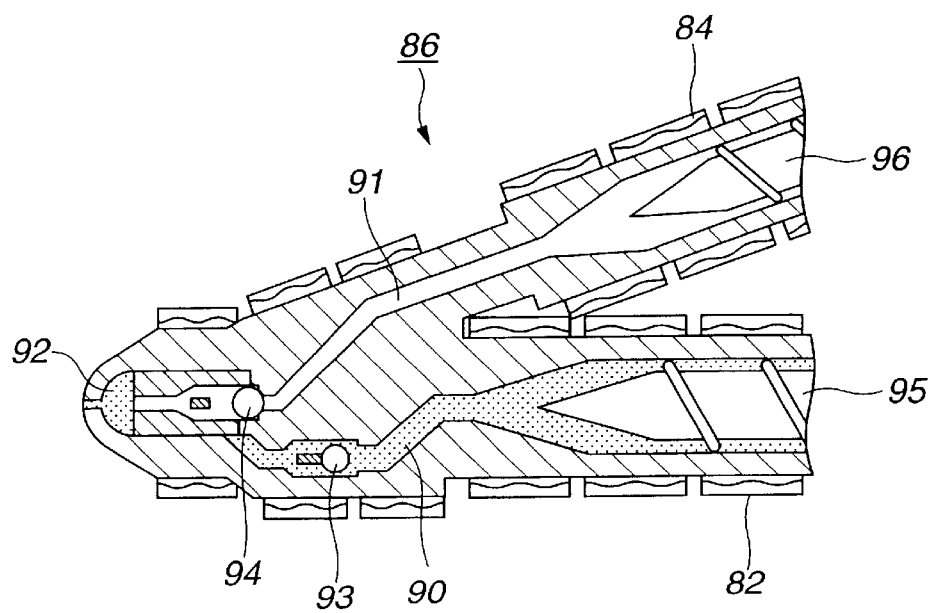
FIG. 15 is an enlarged cross-sectional view showing a nozzle portion of the injection molding device

The nozzle 86 injects the resin injected from the first injection unit 82 and the resin injected from the second injection unit 84 to the metal mold unit 81. The nozzle 86 includes a superficial resin passage 90, a core resin passage 91, a connector 92, a first resin reversal preventative valve 93 and a second resin reversal preventative valve 94, as shown in FIG. 15.

The superficial resin passage 90 is connected to the first injection unit 82 and is traversed by the resin injected from the first injection unit 82 by a first screw 95 The core resin passage 91 is connected to the second injection unit 84 and is traversed by the resin from the second injection unit 84 by a second screw 96.

The connector 92 is a site where are confluent the resin injected from the first injection unit 82 and the resin injected from the second injection unit 84. The first resin reversal preventative valve 93 prohibits reversal of resin which has traversed the superficial resin passage 90, whilst the second resin reversal preventative valve 94 prohibits reversal of resin which has traversed the core resin passage 91.

The mold unit tightening piston 87 is moved under a pressure applied from the mold unit tightening cylinder 88 as later explained. By movement of the mold unit tightening piston 87, it becomes possible to pressure the metal mold unit 81 to a pre-set pressure value to mold unit 81 to mold the substrate 26 as well as to hold the metal mold unit 81.

The mold unit tightening cylinder 88 serves for pressuring the metal mold unit 81 to a pre-set pressure value after injection to the metal mold unit 81 of a material used for molding the substrate of the disc-shaped recording medium 20. The molding material is injected to the metal mold unit 81 by pressuring the metal mold unit 81 in this manner to effect the molding.

In forming the substrate 26 in the disc-shaped recording medium 20 by the above-described injection molding device 80, an insert member is fitted to the centering pin of the metal mold unit 81. The resin as a molding material for the superficial portion is injected into the first hopper 83, whilst the resin as a molding material for the core 28 is injected into the second hopper 85. The resin injected to the first hopper 83 is supplied to the first injection unit 82, while the resin supplied to the second hopper 85 is supplied to the second injection unit 84.

Next, the first screw 95 is moved in the first injection unit 82 to inject into the metal mold unit 81 a resin which is to mold one of the first and second superficial portions 28, 30 by way of the first resin injecting operation. The second screw 96 is then moved in the second injection unit 84 to inject the remaining resin, that is a resin which is to form the other of the first and second superficial portions 28, 30. The mold unit tightening piston 87 then is moved by the mold unit tightening cylinder 88 to pressure the metal mold unit 81 to form the substrate 26. Meanwhile, a pattern of crests and recesses corresponding to the pits and grooves on a stamper loaded on the metal mold unit 81 is transcribed to the first superficial layer 28.

The substrate 26 in the disc-shaped recording medium 20 is prepared by injection molding the resin by the injection molding device described above. At this time, the lug 22a of the clamp member 22 meshes with the substrate 26 to prevent the clamp member 22 from descending from the substrate. when the temperature of the resin that makes up the substrate 26 falls to below the thermal deformation temperature, the substrate is detached from the stamper and taken out from the metal mold unit 81.

By forming the substrate 26 as described above, it becomes possible to suppress the signal of the stamper 64 and true circularity of the clamp member 22 to within the mounting clearance of the clamp member 22 to the metal mold unit 51 This allows to provide a disc-shaped recording medium as free from eccentricity as possible. Since the labor of subsequently bonding the clamp member 3 to the disc-shaped recording medium 1 may now be eliminated, it becomes possible to simplify the manufacturing process of the disc-shaped recording medium 20 to improve the productivity.

The light reflecting layer 25 and the signal recording layer 24 are coated or deposited sequentially on the first superficial layer 26 of the first substrate 26 by, for example, sputtering, and the light transmitting layer 23 is formed with resin using a pre-set technique, such as spin coating or roll coating. This completes the disc-shaped recording medium 20.

By forming the substrate 26 by the injection molding device 10, it is possible to unify the clamp member 22 and the substrate 26 of the disc-shaped recording medium 20 together. The result is the disc-shaped recording medium 20 which suffers from the eccentricity to the least extent and in which it is possible to prevent slipping from occurrence.

Moreover, since the core 29 is formed of a material having a high toughness, it is less susceptible to warping or the like deforming.

The method for forming the substrate 4 using a heating press instead of the injection molding is hereinafter explained. In this case, use is made of a dedicated metal mold unit 100 which is now explained.

Figure 16:
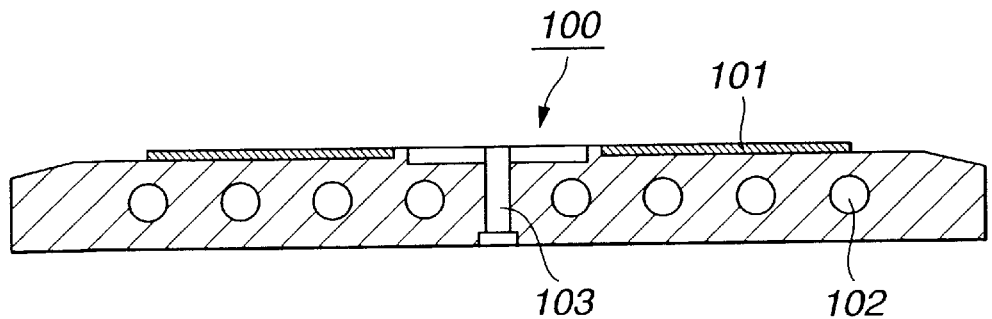
FIG. 16 is a cross-sectional view showing a dedicated metal mold, that is a metal mold unit used only for molding the disc-shaped recording medium according to the present invention.

The dedicated metal mold unit 100 used includes a stamper 101, a temperature adjustment circuit 102, and a centering pin 103, as shown in FIG. 16. The stamper 101 is mounted on the dedicated metal mold unit 100 and is used as a master disc for forming a pre-set pattern of crests and recesses on one substrate surface, as shown in FIG. 2. The stamper 101 is secured in position along a guide, not shown, provided on the dedicated metal mold unit 100. The temperature adjustment circuit 102 is comprised of a continuous duct provided within the dedicated metal mold unit 100. The temperature of the dedicated metal mold unit 100 is adjusted e.g., by flowing e.g., hot water through the inside of the duct. The centering pin 103 is provided centrally of the dedicated metal mold unit 100 and sets the center of the substrate 4 to be molded.

First, the clamp member 104 is subjected to priming. According to the present invention, this priming was performed by dipping the clamp member in the PRIMER-ZPP-1, a trade name of a product manufactured by NIPPON ZEON COMPANY. LTD.

Figure 17:
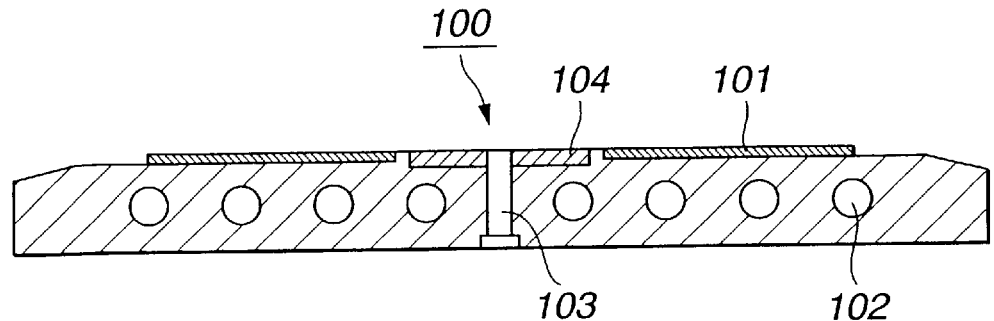
FIG. 17 shows a production process for a disc-shaped recording medium according to the present invention and more specifically shows the dedicated metal mold unit as the clamp member is mounted thereon in cross-section.

The clamp member 104 then is set on the dedicated metal mold unit 100, as shown in FIG. 17. At this time, the clamp member 104 and the centering pin 103 are fitted to each other. Then, a temperature higher by 10° C. to 40° C. than the glass transition temperature of the resin as the material for molding the dedicated metal mold unit 100 is set by the temperature adjustment circuit 102. The result is that a sheet member 105, placed on the stamper 101 of the metal mold unit 100, is heated to a state enabling transcription of the pattern of crests and recesses from the stamper 101 and bonding of the sheet member to the clamp member 104.

Figure 18:
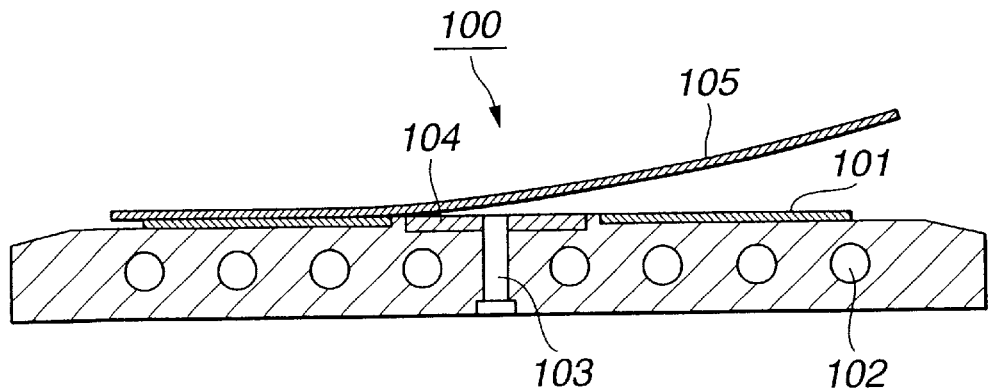
FIG. 18 is a cross-sectional view showing a sheet formed of resin as it is placed on the dedicated metal mold.

The sheet member 105 of resin then is mounted on the stamper 101, as shown in FIG. 18. For outer diameter processing, as later explained, the sheet member 105 needs to be larger in outer size than the disc-shaped recording medium 1, it being sufficient if the sheet member is of a desired disc shape or of a desired shape other than the disc shape. If the sheet member operating as the substrate is of a mono-layer structure, the disc-shaped recording medium 1 is ultimately produced. If the sheet member 105 is of a three- or five-layer structure, the disc-shaped recording medium 20 or the disc-shaped recording medium 35 is produced, respectively.

Figure 19:
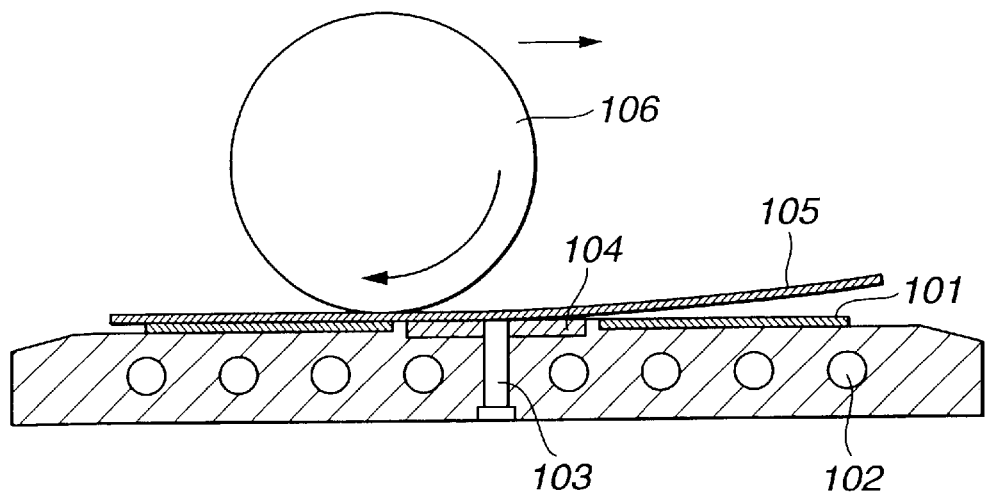
FIG. 19 is a cross-sectional view showing the state in which the clamp member and the sheet formed of resin are pressure-bonded to each other by a roll.
Figure 20:
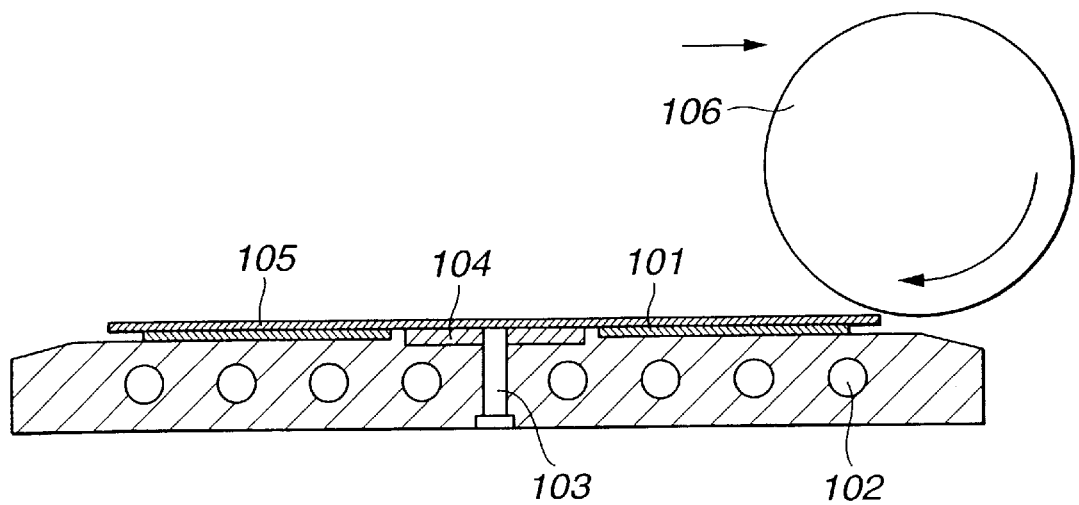
FIG. 20 is a cross-sectional view showing the state in which the clamp member and the resin sheet pressure-bonded together and are being cooled.

The roll 106 then is moved in the direction indicated by arrow in FIGS. 19 and 20 to pressure the sheet member 105 in a direction towards the stamper 101, whereby the clamp member 104 and the sheet member 105 are pressure-bonded together. In this case, the roll 106 is desirably moved as the sheet member 105 is floated from the metal mold unit 100 in order to remove a gas, such as air, from the space between the metal mold unit 100 and the sheet member 105. Meanwhile, the sheet member 105 may be pressed not by the roll 106, but by a press. It is noted that the dedicated metal mold unit 100 and the stamper 101 are not planar in shape but convex at mid portions in order to extract the substrate from the space between the metal mold unit 100 and the sheet member 105. By pressuring with the roll 106, the clamp member 104 and the sheet member 105 are bonded together, at the same time as the pattern of crests and recesses on the stamper 101 is transcribed to one surface side of the sheet member 105.

Figure 21:
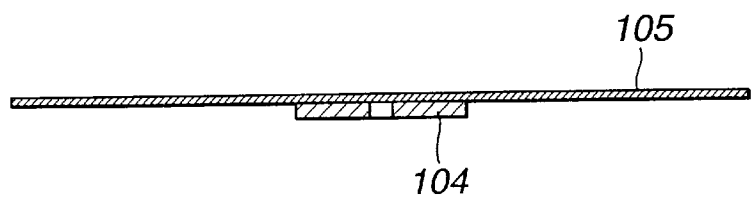
FIG. 21 is a cross-sectional view showing the state in which the resin sheet has been peeled.

Then, as shown in FIG. 21 the temperature of the dedicated metal mold unit 100 is lowered to below the glass transition temperature of the resin by the temperature adjustment circuit 102 such as by lowering the temperature of the water flowing through the duct. This lowers the temperature of the sheet member 105 to impart toughness thereto. The clamp member 104 and the sheet member 105 are peeled off from the stamper 101 of the metal mold unit 100 and taken out of the metal mold unit 100. It is noted that a lug similar to the lugs 3a, 22a provided on the clamp members 3, 22, respectively, is formed on the outer periphery of the clamp member 104, this lug meshing with the sheet member 105 to prevent the clamp member 104 from being detached from the sheet member 105.

Figure 22:
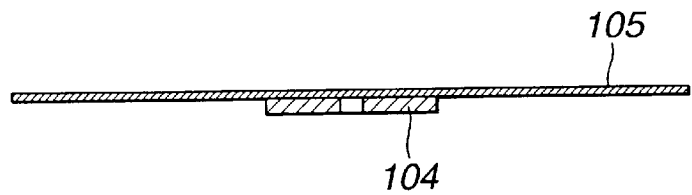
FIG. 22 is a cross-sectional view showing the disc-shaped recording medium trimmed to a pre-set outer diameter.
Figure 23:
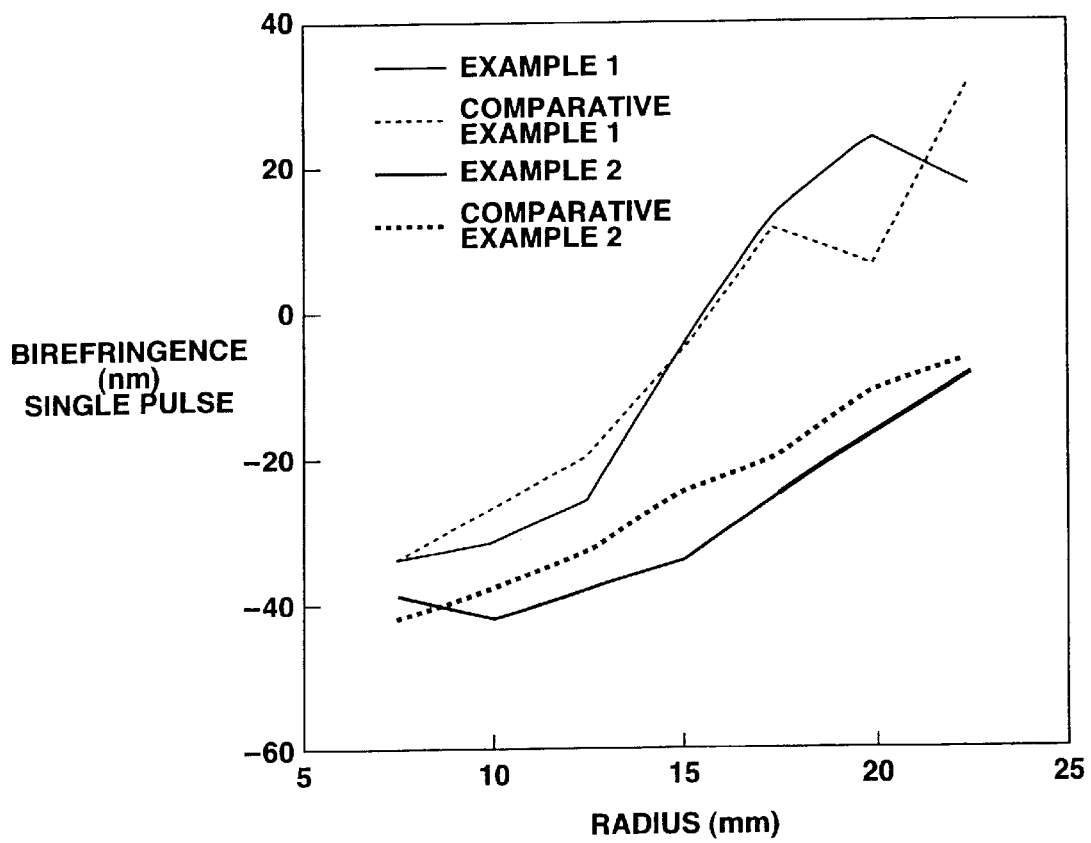
FIG. 23 is a graph showing the relation between the radius of the disc-shaped recording medium and the birefringence.
Figure 24:
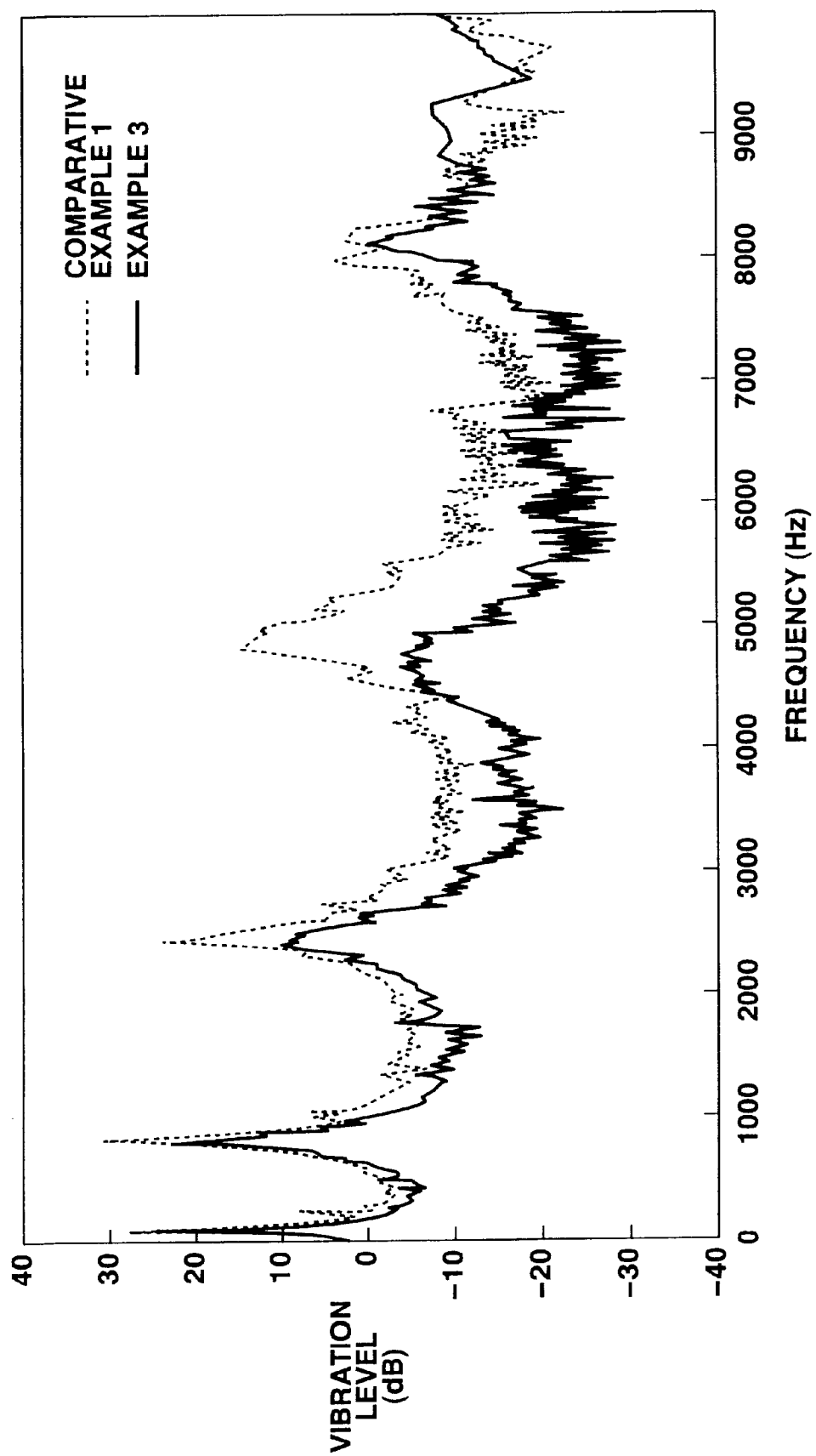
FIG. 24 is a graph showing measured results of vibration levels of the disc-shaped recording medium.

As shown in FIG. 22, the outer profile of the sheet member 105 is worked and trimmed, such as by press working and machining, with the center opening of the clamp member 104 as a reference, to obtain a disc-shaped substrate 4 of a desired size. On the substrate 4, thus trimmed, the signal recording layer, light reflecting layer and the protective layer are formed in a manner as described above to complete the disc-shaped recording medium 1 shown in FIGS. 1 and 2. Although the method of bonding the clamp member 104 and the sheet member 105 together on the metal mold unit 100 has been described, the disc-shaped recording medium according to the present invention may also be obtained by pressure molding an assembly of the clamp member 104 and the substrate 4, pre-fitted or pre-bonded together, by the aforementioned injection molding method, so that the clamp member and the substrate will be flush with each other. The disc-shaped recording mediums 1, 20 may also be loaded in position on the turntable, such as to suppress eccentricity and to prevent slipping from occurring during rotation.

In the manufacturing method of the disc-shaped recording mediums 1 as shown in FIGS. 1 and 2, and 20 as shown in FIGS. 6 and 7, by pressuring under heating, as in the manufacturing method by the aforementioned injection molding, it is possible to dispense with the process of subsequently bonding the clamp member to the recording mediums 1, 20 in preparing the disc-shaped recording mediums 1, 20. This simplifies the manufacturing process for the disc-shaped recording mediums 1, 20 to improve the productivity.

Similarly to the manufacturing method for the disc-shaped recording mediums 1, 20, prepared by the above-described injection molding method, the manufacturing method by a heating press allows to omit the step of subsequently bonding a clamp member to the disc-shaped recording mediums 1, 20 in the preparation of the disc-shaped recording mediums 1, 20 to render it possible to simplify te manufacturing process fort the disc-shaped recording mediums 1, 20 to improve the productivity.

As may be seen from the foregoing description, it is possible to prepare the disc-shaped recording medium in which the major surfaces of the substrate and the clamp member 3 will be flush with each other, as shown in FIGS. 2 and 7. The clamp members in the respective disc-shaped recording mediums are mounted at the outset at the center of the metal mold unit when manufacturing the disc-shaped recording mediums and hence the clamp members may be mounted centrally of the disc-shaped recording mediums with higher accuracy than conventionally.

Since this reduces the offset of the disc-shaped recording medium t relieve the load otherwise applied to the rotational shaft of the spindle motor, it is possible to relieve the load applied to the rotational shaft of the spindle motor. Since track servo disengagement is not likely to occur in recording and/or reproduction, it is similarly possible to reduce error occurrence in recording and/or reproduction.

The present invention will be explained with reference to several Examples and Comparative Examples.

The specific gravity, glass transition temperature, bending modulus of elasticity and the water absorption coefficient of the resins used in preparing the substrates in the Examples 1 to 4 and Comparative Examples 1 and 2 are shown in the following Table 2:

TABLE 2

| | polycarbonate resin | | | | |
|---|---|---|---|---|---|
| articles of commerce | AND-5503 | ST-300 | E-28R | E-490 | sheet |
| charged materials and amount of addition | AB15 + W5% | no additive | no additive | no additive | no additive |
| specific gravity | 1.26 | 1.2 | 1.13 | 1.01 | 1.01 |
| glass transition temperature | 143 | 143 | 146 | 136 | 140 |
| bending modulus of elasticity | 30000 | 24000 | 28700 | 25000 | 31000 |
| water absorption coefficient | 0.3 | 0.3 | 0.15 | less than 0.01 | less than 0.01 |

EXAMPLE 1

First, the end face of the rim of the centering pin in the metal mold unit of the injection molding device shown in FIG. 9 was indented by a technique such as knurling.

The SUS 430 metal sheet, operating as a clamp member, usable as a magnet clamp, with a thickness of 1.2 mm, was mounted by a robot to the centering pin of the metal mold.

Then, a polycarbonate resin of the injection molding grade, manufactured by TEIJIN KASEI KK under a trade name of polycarbonate AD-9000TG, was injected into a hopper of the injection molding device and melted by heating to 340° C. by an injection unit. The temperature of the metal mold unit was adjusted to 127° C. and the polycarbonate resin was injected from the injection unit into the metal mold unit at an average injection velocity of 140 mm/sec to produce a disc-shaped recording medium having a single-layer substrate corresponding to the disc-shaped recording medium 1 shown in FIG. 2.

By repeating the above process several times after cooling the metal mold unit for ten seconds, plural disc-shaped recording mediums with respective different radii were obtained. The disc-shaped recording mediums obtained were 0.6 mm in thickness and 5 cm in outer diameter. The track pitch on the stamper was 0.5 µm, with the signal depth being 80 mm.

A plurality of disc-shaped recording mediums with single-layer substrates and with different diameters, were prepared, as in Example 1, in the same way as in Example 1, except mounting the SUS430 metal sheets on the injection-molded substrates, as clamp members, using an adhesive.

EXAMPLE 2

First, magnetic barium ferrite powders are added in an amount of 50 wt % to Zeonex E-28R (injection molding grade amorphous polyolefin resin manufactured by NIPPON ZEON COMPANY LIMITED). This sheet was punched or machined to prepare a clamp member. A plurality of disc-shaped recording mediums, with single-layer substrates and with different radii, were prepared in the same way as in Example 1 except using this clamp member.

Meanwhile, the end face in the vicinity of the centering pins in the metal mold unit of the injection molding device shown in FIG. 9 was not worked in this case to a recessed shape. The reason is that, since the clamp member 3 and the signal recording unit as it is so-called in the disc-shaped recording medium 1 of FIG. 2 are both formed of resin, and the end faces of the clamp member and the substrate making up the signal recording unit are fused together in injecting the resin for molding the substrate making up the signal recording unit, the clamp member is not peeled from the substrate making up the signal recording unit when peeling the disc-shaped recording medium from the metal mold unit.

COMPARATIVE EXAMPLE 2

A plurality of disc-shaped recording mediums with single-layer substrates and with different radii were prepared in the same way as in Example 2, except mounting the SUS430 metal sheets on the previously injection-molded substrate as clamp members, using an adhesive.

The relationship between the radius and the double refractive index was checked of the disc-shaped recording mediums obtained in the Examples 1, 2 and Comparative Examples 1, 2. It was found that there was no difference in the double refractive index on comparison of the Example 1 and the Comparative Example 1. It was also found that there was no difference in the double refractive index on comparison of the Example 2 and the Comparative Example 2.

From these, it was found that no difference is caused in the double refractive index even in case the substrate is molded after initially mounting the clamp member on the centering pin of the injection molding device.

It was also found from the results of Example 2 that the double refractive index was not lowered even in case a clamp member was prepared by a resin composition admixed with a magnetic material and this clamp member was used in injection molding.

EXAMPLE 3

First, the end face in the vicinity of a centering pin in a metal mold unit of an injection molding device shown in FIG. 14 was worked to a recessed shape.

Then, a SUS430 metal sheet, as an insert member, was mounted on a centering pin of the metal mold unit by a robot.

Then, polycarbonate ST-3000 (polycarbonate resin of the injection molding grade manufactured by TEIJIN KASEI KK), which is to be the first and second superficial portions of a three-layered substrate, was charged into the first hopper. The polycarbonate resin was then melted on heating, with the temperature of the cylinder head and that of the nozzle being 330° C. and 310° C., respectively.

Then, a resin obtained on mixing 15 wt % of the graphite AB (manufactured by DENKI KAGAKU KOGYO KK) and 5 wt % of whiskers W (wollastonite) to polycarbonate AD-9000TG was injected into a second hopper. This proves a core of the three-layered substrate. The resin was melted on heating with the temperature of 345° C. of the cylinder head. The temperature of the cylinder head at this time was 330° C., with the nozzle temperature being 310° C.

Meanwhile, the graphite AB is a filler for improving resonance characteristics, whilst the whisker W is a filler for improving the strength.

The polycarbonate resin admixed with the graphite AB and the whiskers W was injected into the metal mold unit, with the temperature of the metal mold unit of 130° C., with the average injection speed of the resin making up the first and second superficial portions being 145 mm/sec and with the average injection speed of the resin making up the core being 160 mm/sec, to produce a three-layered substrate making up the recording medium.

After cooling the metal mold unit for 12 seconds, the above process was repeated several times to produce several disc-shaped recording mediums with three-layered substrates and with different radii. In each of the disc-shaped recording mediums, thus prepared, the thickness of the insert portion of the clamp member was 1.2 mm, whilst that of a portion corresponding to the signal recording unit 26 of FIG. 7 was 0.6 mm.

The state of vibrations was measured of the disc-shaped recording mediums, obtained in the Example 3 and the Comparative Example 1. It was found that the disc-shaped recording medium obtained in Example 3 was lower in vibration level than the disc-shaped recording medium obtained in Comparative Example 2 and hence superior in resonance characteristics.

EXAMPLE 4

First, the end face in the vicinity of a centering pin in a dedicated metal mold as shown in FIG. 16 was worked to a recessed shape.

Then, the SUS430 metal sheet was subjected to priming by dipping the sheet in the PRIMER-ZPP-1 (a trade name of a product manufactured by NIPPON ZEON COMPANY. LTD; a MIBK solution with 5 wt % of a solid content), and by drying at 80° C. for 15 minutes. The SUS430 metal sheet was mounted on a centering pin in the dedicated metal mold unit.

The dedicated metal mold unit, carrying the SUS430 metal sheet, was heated to 160° C. by adjusting the temperature of the metal mold by the temperature adjustment circuit. This temperature of 160° C. is higher by 20° C. than 140° C. which is the glass transition temperature of the Zeonex E-490 and the Zeonex E-48R which will be referred to subsequently.

Then, a Zeonex E490, 0.2 mm in thickness, a Zeonex E48-R sheet, admixed with 15 wt % graphite, a sheet obtained on dipping a non-woven cloth of carbon fibers (toleca-mat=article number B-030 TORAY) in a toluene solution followed by drying, a Zeonex E48-R sheet, 0.25 mm in thickness, admixed with 15 wt % of graphite, and a Zeonex E490 sheet, 0.2 mm in thickness, were sequentially layered to give a three-layered substrate.

This substrate was pressure-bonded to a resin sheet making up a substrate and an SUS metal sheet, using a pressure-bonding roll, heated to 130 to 140° C., as shown in FIGS. 19 and 20. The pressure by the pressure-bonding roll was set to approximately 50 kg/12 cm width to 100 kg/12 cm width, with the linear velocity in rolling the pressure-bonding roll being approximately 3 m/sec to 4 m/sec.

The dedicated metal mold unit was cooled to approximately 100° C. and the substrate unified to the clamp member was dismounted, that is peeled, from the dedicated metal mold unit.

The substrate then was machined or punched, using a center opening formed in the clamp member as a reference, to prepare a disc-shaped recording medium of a desired shape. This process was repeated plural times to produce a plurality of disc-shaped recording mediums with different radii.

Of the disc-shaped recording mediums, obtained in Example 4, the double refractive index was measured. It was seen from the measured results that no significant difference is caused in the double refractive index when the substrate is prepared using a heating press by a dedicated metal mold unit as when the injection molding device is used.

INDUSTRIAL APPLICABILITY

In the disc-shaped recording medium according to the present invention, in which a clamp member of a magnetic material having a positioning center portion, such as a centering opening, is unified to the substrate, having a signal recording layer on one major surface thereof, so that the major surface of the clamp member will be flush with the substrate surface, the clamp member can be strongly unified to the substrate to high precision.

Since the clamp member is unified to high precision to the substrate, a disc-shaped recording medium exempt from eccentricities may be produced.

Since the clamp member is formed of a resin composition admixed with the magnetic material, the force of friction of the clamp member may be increased, such that, when the clamp member is run in rotation as it is loaded on the turntable, the clamp member may be run in rotation in synchronism with turntable rotation without producing slipping.

What is claimed is:

1. A disc-shaped recording medium comprising:
    a substrate;
    a signal recording layer provided on one major surface of the substrate; and
    a clamp member having a positioning unit at a center portion thereof, and including a material that can be magnetically attracted by a magnet, said clamp member being unified to the center portion of said substrate so that a surface of said clamp member will be flush with a surface of said substrate,
    wherein said clamp member includes a lug on an outer periphery thereof contacting said substrate.

2. The disc-shaped recording medium according to claim 1 wherein said substrate includes a core and a superficial portion provided at least between said core and the signal recording layer.

3. The disc-shaped recording medium according to claim 2 further comprising:
    a light transmitting layer on a surface of said signal recording layer opposite to a surface thereof facing said substrate.

4. The disc-shaped recording medium according to claim 2 wherein said substrate includes a further superficial portion on a surface thereof opposite to a surface of said core facing said signal recording layer.

5. The disc-shaped recording medium according to claim 2 wherein said superficial portion includes a synthetic resin or a resin composition having water absorption coefficient not larger than 0.3%.

6. The disc-shaped recording medium according to claim 1 wherein said clamp member includes a resin admixed with a magnetic material.

7. The disc-shaped recording medium according to claim 1 wherein said clamp member comprises a polygonal cross-section.

8. A method for the preparation of a disc-shaped recording medium comprising:
    mounting a clamp member at a center portion of a metal mold unit;
    injecting a resin into said metal mold unit to mold a substrate;
    taking out said substrate unified to said clamp member when the resin injected into said metal mold unit is at a temperature not higher than the thermal deformation temperature; and
    forming a signal recording layer on one major surface of the substrate,
    wherein said clamp member includes a material that can be magnetically attracted by a magnet, and includes a lug on an outer periphery thereof contacting said substrate.

9. The method for the preparation of a disc-shaped recording medium according claim 8 further comprising:
    forming a signal recording layer on one surface of the substrate taken out.

10. The method for the preparation of a disc-shaped recording medium according to claim 8 further comprising:
    injecting a first resin material into said metal mold unit to mold a superficial portion making up the substrate; and
    injecting a second resin material into said metal mold unit after molding said superficial portion to mold a core making up said substrate.

11. The method for the preparation of a disc-shaped recording medium according to claim 10 further comprising:
    injecting said first resin material into said metal mold unit to mold a further superficial portion making up said substrate.

12. A method for the preparation of a disc-shaped recording medium comprising:
    mounting clamp member at a center portion of a metal mold unit;
    heating said metal mold unit and subsequently placing a sheet member on said metal mold unit;
    pressuring said sheet member in a direction of pressure bonding said sheet member to said clamp member;
    cooling said metal mold unit and subsequently peeling said sheet member unified to said clamp member from said metal mold unit; and
    forming a signal recording layer on one major surface of the substrate, wherein said clamp member includes a material that can be magnetically attracted by a magnet and includes a lug on an outer periphery thereof contacting said substrate.

13. The method for the preparation of a disc-shaped recording medium according to claim 12 wherein said metal mold unit is heated to a temperature higher than the glass transition temperature of said sheet member and subsequently said sheet member is placed on said metal mold unit.

14. The method for the preparation of a disc-shaped recording medium according to claim 13 wherein said metal mold unit is cooled to a temperature not higher than the glass transition temperature of said sheet member and subsequently said sheet member is peeled from said metal mold unit.

15. The method for the preparation of a disc-shaped recording medium according to claim 12 wherein said sheet member peeled from said metal mold unit is worked for trimming its outer shape.

16. The method for the preparation of a disc-shaped recording medium accordin to claim 12 wherein a signal recording layer is provided on one surface of said sheet member.

17. The method for the preparation of a disc-shaped recording medium according to claim 12 wherein said sheet member is pressured by a pressuring roll in a direction of pressure bonding said sheet member to said clamp member.

18. A disc-shaped recording medium comprising:
a substrate;
a signal recording layer provided on one major surface of said substrate; and
a clamp member having a positioning unit at a center portion thereof, and including a material that can be magnetically attracted by a magnet, said clamp member being unified to said substrate at a time of molding said substrates,
wherein said clamp member has a lug on an outer periphery thereof contacting said substrate.

19. The disc-shaped recording medium according to claim 18 wherein said substrate includes a core and a superficial portion provided at least between said core and the signal recording layer.

20. The disc-shaped recording medium according to claim 19 further comprising:
a light transmitting layer on a surface of said signal recording layer opposite to a surface thereof facing said substrate.

21. The disc-shaped recording medium according to claim 19 wherein said substrate includes a further superficial portion on a surface thereof opposite to a surface of said core facing said signal recording layer.

22. The disc-shaped recording medium according to claim 19 wherein said superficial portion includes a synthetic resin or a resin composition having water absorption coefficient not larger than 0.3%.

23. The disc-shaped recording medium according to claim 18 wherein said clamp member includes a resin admixed with a magnetic material.

24. The disc-shaped recording medium according to claim 18 wherein said clamp member comprises a polygonal cross-section.

* * * * *